(12) United States Patent
Tremblay et al.

(10) Patent No.: US 11,933,768 B2
(45) Date of Patent: Mar. 19, 2024

(54) SYSTEMS AND METHODS FOR CONTROL OF A TORSIONAL MATERIAL TESTING SYSTEM BASED ON OPERATIONAL STATES OF THE TORSIONAL MATERIAL TESTING SYSTEM

(71) Applicant: Illinois Tool Works Inc., Glenview, IL (US)

(72) Inventors: Keith J. Tremblay, North Attleboro, MA (US); Nicholas H. Bradshaw, Haverhill, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/487,820

(22) Filed: Sep. 28, 2021

(65) Prior Publication Data
US 2022/0113234 A1    Apr. 14, 2022

Related U.S. Application Data

(60) Provisional application No. 63/090,020, filed on Oct. 9, 2020.

(51) Int. Cl.
*G01N 3/08* (2006.01)
*G01N 3/02* (2006.01)
*G01N 3/04* (2006.01)
*G01N 3/22* (2006.01)
*G01N 3/24* (2006.01)

(52) U.S. Cl.
CPC ............... *G01N 3/22* (2013.01); *G01N 3/04* (2013.01)

(58) Field of Classification Search
CPC .... G06F 11/3688; G06F 11/079; G06F 30/20; G06F 1/1643; G06F 11/3676; G06F 1/3696; G06F 30/00; G06F 11/3668; G06F 9/4401; G06F 11/3428; G06F 11/263; G06F 11/3664; G06F 11/3684; G06F 11/3672; G01N 35/00871; G01N 3/02; G01N 3/62; G01N 3/42; G01N 29/043; G01N 3/08;
(Continued)

(56) References Cited

U.S. PATENT DOCUMENTS 10,866,174 B2 * 12/2020 Tsuji ................. G05B 19/00
2010/0011873 A1 * 1/2010 Kaneda ................. G01N 3/02
73/788

(Continued)

OTHER PUBLICATIONS

Int'l Search Report and Written Opinion Appln No. PCT/US2021/053933 dated Jan. 26, 2022.
(Continued)

*Primary Examiner* — Brandi N Hopkins
(74) *Attorney, Agent, or Firm* — McAndrews, Held & Malloy, Ltd.

(57) ABSTRACT

Methods and systems are provided for a torsional material testing system, which includes a rotatable actuator, such as a motor, configured to perform a torsional material testing operation. During a torsional material testing operation, a virtual interlock is configured to engage or disengage with the actuator to prevent or allow rotational movement of the actuator (e.g., during a setup state or during a torsional material testing operation, respectively). A control circuitry is employed to control the virtual interlock as well as the torsional testing system based on one or more operational states before, during, or after a material testing process.

19 Claims, 15 Drawing Sheets

(58) Field of Classification Search
CPC ............ G01R 31/2849; G01R 31/3193; G01R 31/2834; G01R 31/26; G01R 31/31713; G01R 1/025; G09B 5/00
See application file for complete search history.

(56) References Cited

U.S. PATENT DOCUMENTS

| | | | |
|---|---|---|---|
| 2013/0055823 A1* | 3/2013 | Kawano | G01N 3/08 73/805 |
| 2020/0173893 A1 | 6/2020 | Peterson | |
| 2020/0173894 A1* | 6/2020 | Pope | G01N 3/08 |

OTHER PUBLICATIONS

Instron: "Instron Torsion Add-On 3.0 Handset for Universal Testing Systems", Apr. 2, 2021 (Apr. 2, 2021), XP055879397, Retrieved from the Internet:URL:https://www.youtube.com/watch?=TYNMVx2vaBk&list=PLF5EI35B8113B7D89&index=22 [retrieved on Jan. 14, 2022].

Instron: "Instron Torsion Add-On 3.0 for Electromechanical Testing Systems", Jan. 8, 2021 (Jan. 8, 2021), XP055879383, Retrieved from the Internet: URL:https://www.youtube.com/watch?v=nU6_cTDw8IM [retrieved on Jan. 14, 2022].

Instron: "Torsion Add-on Version 3 Operator's Guide MI0-17497-EN Revision A", Jan. 18, 2021 (Jan. 18, 2021), XP055879466, Retrieved from the Internet: URL:https://www.instron.com/-/media/literature- library/manuals/torsion-add-on-version-3-user-manual .pdf?la=en [retrieved on Jan. 14, 2022].

* cited by examiner

SYSTEMS AND METHODS FOR CONTROL OF A TORSIONAL MATERIAL TESTING SYSTEM BASED ON OPERATIONAL STATES OF THE TORSIONAL MATERIAL TESTING SYSTEM

CROSS REFERENCE TO RELATED APPLICATIONS

This application is a Non-Provisional Patent Application of U.S. Provisional Patent Application No. 63/090,020 entitled "Systems And Methods For Control Of A Torsional Material Testing System" filed Oct. 9, 2020, which is herein incorporated by reference in its entirety.

BACKGROUND

This disclosure relates generally to materials testing, and more particularly, to systems and methods for material testing systems including torsional material testing systems.

Universal testing machines are used to perform mechanical testing, such as compression strength testing, tension strength testing, or torsional strength testing, on materials or components.

SUMMARY

Systems and methods are disclosed for material testing, which include torsional material testing systems, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
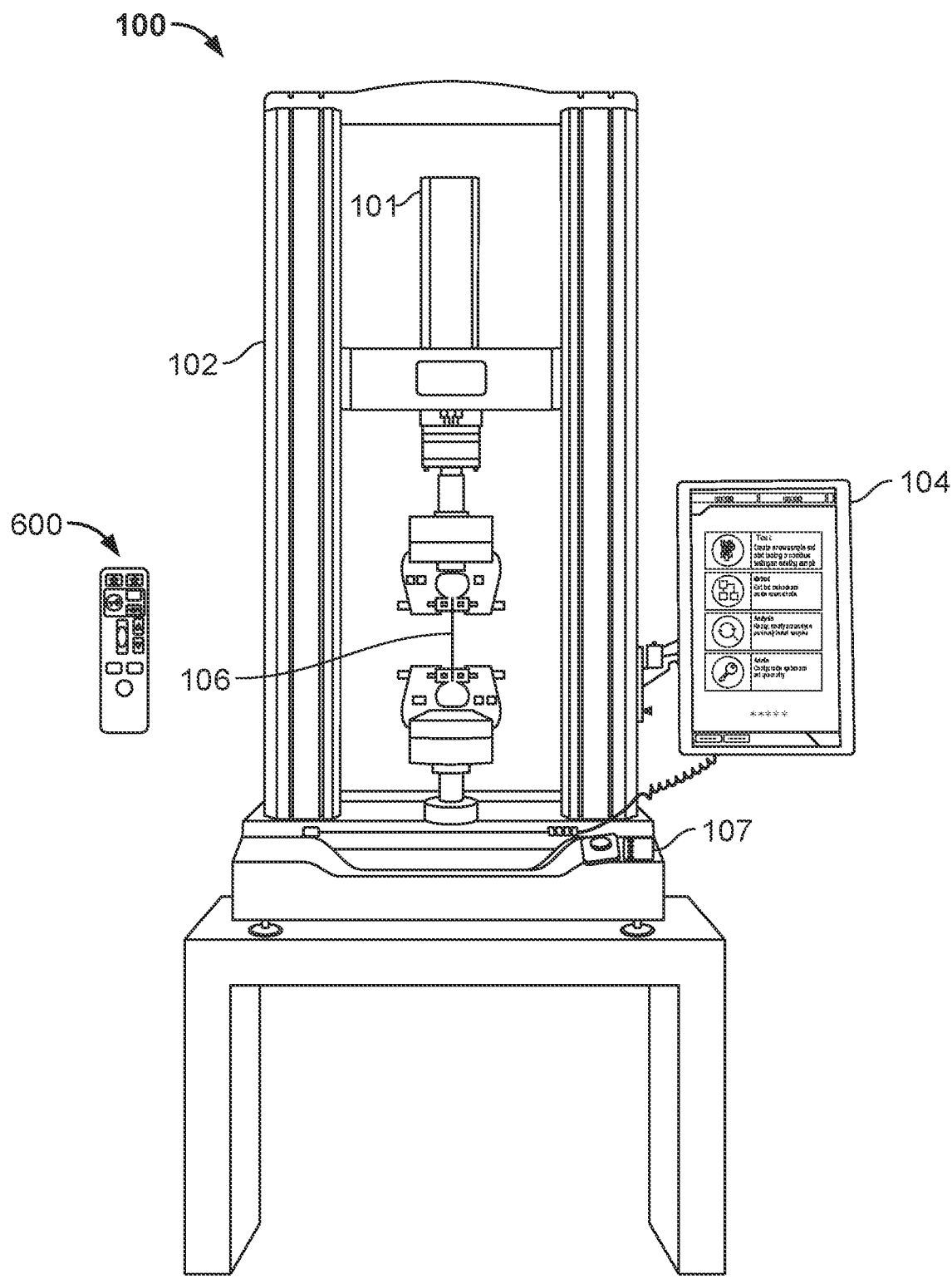
FIG. 1 is an example testing device to perform mechanical property testing, in accordance with aspects of this disclosure.

Disclosed are systems and methods for torsional strength testing. In particular, the disclosed torsional material testing system employs a number of safety modes and software architecture to ensure safe operation of the system. For instance, rotary motion is safely disabled when the system operates in an unrestricted or testing mode, which is also indicated to the operator visually, audibly, or by other suitable feedback.

When the system is operating in a restricted mode (e.g., a disabled or setup mode), a virtual interlock prevents powered motion of the rotary drive system. This allows for an operator to engage with the system without unintentional activation of the torsional material testing system. In some examples, the rotary drive system (e.g., rotational motor) allows for manual jogging. For example, the virtual interlock may be activated, thereby preventing powered motion of the rotary drive system, while allowing physical rotation of the material under test.

In some examples, a motor brake is provided to lock rotational movement of the rotary drive system motor. The brake may be implemented manually and/or in response to a trigger, either by hardware and/or software. For instance, the rotary drive system can be locked with the motor brake when the material testing system is configured for axial setup or testing, but without rotational movement or torsional testing.

In some examples, an unrestricted mode (including the testing state) allows for jogging the motor to move either clockwise or counterclockwise, such as by use of a user interface (e.g., remote device, control panel, connected computing platform, etc.). Following a torsional material testing process, the rotary drive system may return to a default or commanded position, either automatically or in response to a user input.

Conventional material testing systems use mitigation techniques, such as configuration switches, guarding, limited force controls, motion limiting, and/or protection, to improve operator safety. However, conventional material testing systems frequently do not always comply with international standards. Conventional mitigation techniques require the operator to place the system in the appropriate mode of operation, such as safe interaction or testing. Many conventional safety techniques can be implemented using off-the-shelf safety components, such as programmable logic controllers (PLCs) and/or relays. PLCs and relays typically add significant cost to the material testing system.

Disclosed example material testing systems embed or integrate a safety system complying with international standards within the material testing system. Because the safety system is integrated into the material testing systems, disclosed example material test systems provide safety improvements at a much lower cost than would be accomplished using off-the-shelf parts because the safety system is integrated into the existing electronics, semiconductors, and/or circuit boards of the material testing systems. Integration further improves reliability, which reduces or eliminates external wiring between purchased safety components.

As described in more detail below, disclosed example safety systems for material testing systems include machine state indicators that visually show the state of the testing machine from an operational restriction perspective. Disclosed example safety systems for material testing systems provide high reliability and monitored activation mechanisms at the machine point of control, which may include internal fault checking and/or power supply diagnostics within the material testing systems.

The disclosed material testing systems are designed for simple, simultaneous axial and torsional testing of devices and/or components, but has the flexibility to be used for purely axial or torsional testing. In some examples, torsional material testing systems control and monitor operational devices, as well as safety systems and associated circuitry. Disclosed example material testing systems are compatible with interlock guarding systems having redundant or diverse contacts. Such guarding systems comply with ISO safety standards by using redundant, diverse, and/or dynamic monitoring in real time. Disclosed example material testing systems include redundant torsional material testing systems monitoring. The material testing system shutdown circuitry of disclosed examples is compliant with international safety standards including ISO 13849-1.

Additionally, conventional off-the-shelf safety relay components used with PLCs use an extra layer of firmware within the PLC to stop the motion of the moving components during an emergency stop event. Disclosed example safety systems for material testing systems are configured to enable the hardware (e.g., an emergency stop button) to directly shutdown a power amplifier drive to the actuator(s), regardless of whether the embedded firmware within the safety processor is running.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling. Firmware may include stored instructions such as Safety Rated Embedded Software (SRESW) and/or Safety Rated Application Software (SRASW).

Disclosed example material testing systems are compliant with the European Machinery Directive, following the rules set forth in the ISO 13849-1 standard, which pertains to the "Safety Related Parts of Control Systems." The following functions, which are determined by a system risk analysis, are integrated into the material testing system. The safety system provides a disabled drive state to remove energy from the drive crosshead, a disabled drive state to remove energy from the torsional material testing system, and a restricted drive state for operator setup. In the restricted drive state, the example safety systems monitor the crosshead speed to maintain the crosshead speed below an upper speed limit, monitor for intentional manual movement (jogging) of the torsional material testing system, monitor for commands for a torsional material testing system process, and/or monitor for unintentional torsional movement.

The disclosed example material testing systems further include an unrestricted drive state, which enables the removal of checks in the restricted drive state. In some examples, the unrestricted drive state can be entered via a dual activation mechanism, in which material testing functionality is performed and the operator does not interact with the system.

Disclosed example material testing systems include indicators for different states, such as a disabled state, a setup state, a caution state (e.g., restricted drive mode), and a testing state (e.g., unrestricted drive mode) indication on every machine to clearly indicate when the operator may interact and when a hazard is present.

Disclosed example material testing systems include one or more stop functions that are configured to take precedence over the starting and/or continuation of motion of components such as the torsional material testing system. Furthermore, one or more stop functions may be redundantly configured via hardware such that the stop functions are effective to disable the material testing system even when software portions of the safety system are disabled. Examples of such stop functions that may be included in disclosed systems include interlocked guards and/or emergency stop switches.

Some disclosed example material testing systems include selection and enforcement of a single control point for starting the material testing frame and/or torsional material testing system. Some example systems provide power failure monitoring and/or protection to ensure the system stops unrestricted operation and places the material test system into the disabled drive state upon re-establishment of power. In some examples, in response to a power failure, the torsional material testing system is automatically de-energized.

Disclosed example safety systems and material testing systems include increased internal diagnostics and reporting to the operator of critical errors within the system, such as malfunctions of equipment or conflicts between redundant inputs, outputs, and/or processes. Disclosed example material testing systems enable faster specimen removal and/or insertion, relative to conventional material testing systems, due to the safe setup mode of the testing machine that permits operator activity within the test space without disabling of the material testing system or requiring guard doors. Disclosed example systems further improve operator safety when setting up and configuring the system inside the test space, due at least in part to use of the setup state, which restricts motion of the torsional material testing system and/or limited motion and/or force that can be applied to or by the torsional material testing system.

Disclosed material testing systems and safety systems may be specially configured to be utilized in the disclosed example configurations, to achieve identified risk mitigations. Disclosed material testing systems are significantly more efficient and targeted to materials testing than purchasing general purpose, off-the-shelf, discrete safety components.

Disclosed material testing systems and safety systems are configured to return to a restricted state whenever the unrestricted states are not in active use and/or to require intentional action by operators to transition from restricted states to the unrestricted states. Example material testing systems and safety systems provide active warning notifications at the time the unrestricted states are activated. Example active warning notifications include defined as notifications that appear and/or disappear at locations the operator is likely to be observing (e.g., as opposed to providing static labels or other static visuals on the material testing system). Furthermore, disclosed example notifications are intuitive, such as by providing commonly understood color schemes (e.g., green, yellow, red) to signify the state of the material testing system.

In some examples, the operator interface includes a hazard indicator, in which the one or more processors are configured to control the hazard indicator while the restriction on the actuator is reduced. Some examples further include a crosshead configured to move to position the material under test or to apply force to the material under test, wherein the actuator is configured to drive the crosshead, and the restriction on the actuator in the setup state includes an upper limit on a rotational travel speed of the crosshead.

In some example material testing systems, the operator interface further includes one or more visual indicators configured to selectively emphasize corresponding ones of the operator selectable inputs, in which the one or more processors are configured to control one or more of the visual indicators to emphasize corresponding ones of the operator-selectable inputs based on the state of the material testing system. In some examples, the one or more processors are configured to transition the state from one of the restricted states to one of the unrestricted states in response to a predefined input to the operator interface. In some examples, the operator interface includes a state indicator configured to output an indication of a present state of the material testing system.

In disclosed examples, a material testing system includes a rotatable actuator configured to control an operator-accessible torsional testing component of the material testing system, a virtual interlock configured to engage or disengage with the actuator to prevent or allow rotational movement of the actuator, and control circuitry. The control circuitry is configured to control the actuator to perform a material testing process, monitor a plurality of inputs associated with operation of the material testing system, identify an operational state of the material testing system from a plurality of predetermined operational states based on the plurality of inputs and the material testing process, the plurality of predetermined operational states comprising one or more of a disabled state, a setup state, a caution state, or a testing state, and control the virtual interlock based on the identified state.

In some examples, the virtual interlock is configured to prevent one or more of power or control signals from activating rotational movement of the actuator.

In some examples, the control circuitry is further configured to identify activation of a non-rotational testing process and engage the brake to lock the actuator from rotational movement in response. In examples, wherein the non-rotational testing process comprises an axial testing process. In examples, the non-rotational testing operates under a plurality of predetermined operational states comprising one or more of a disabled state, a setup state, a caution state, or a testing state In some examples, the operational state of the non-rotational testing process holds priority over the operational state of the torsional system. In some examples, when the non-rotational testing process is operating in the setup state, the control circuitry is configured to control the virtual interlock to engage to prevent powered rotational movement of the torsional system.

In examples, the control circuitry is further configured to control the virtual interlock to engage or disengage in response to a signal from one or more sensors. In some examples, engagement of the virtual interlock corresponds to a restricted mode, such that the disabled state, the caution state, and the setup state correspond to the restricted mode preventing operation of the actuator. In examples, the restriction mode corresponds to application of restrictions on the actuator while the control circuitry does not control the actuator in response to operator inputs. In examples, the testing state corresponds to an unrestricted mode allowing operation of the actuator, the testing state corresponds to a reduction in restrictions on the actuator operation while controlling the actuator to perform a torsional material testing process or a jog or a return.

In some examples, the restrictions include one or more of limiting a rotational speed of the actuator, limiting a number of revolutions of the actuator, or limiting an angle of rotation of the actuator. In examples, the limiting is limited to a particular threshold or limited to zero movement. In some examples, the virtual interlock is engaged and the brake is disengaged and the actuator is configured to allow the operator to manually position the actuator in the setup state.

In examples, the control circuitry includes a control processor configured to perform the control of the actuator, and one or more safety processors configured to perform the monitoring of the plurality of inputs, the identifying the state of the material testing system, and the controlling of the virtual interlock.

In some disclosed examples, a material testing system includes a rotatable actuator configured to control an operator-accessible torsional testing component of the material testing system, a brake to prevent rotational movement of the rotatable actuator, a virtual interlock configured to engage or disengage with the actuator to prevent or allow rotational movement of the actuator, and control circuitry. The control circuitry is configured to control the actuator to perform a material testing process, monitor a plurality of inputs associated with operation of the material testing system, identify an operational state of the material testing system from a plurality of predetermined operational states based on the plurality of inputs and the material testing process, the plurality of predetermined operational states comprising one or more of a disabled state, a setup state, a caution state, or a testing state, and control the virtual interlock based on the identified state.

In some examples, the brake is configured to physically lock the actuator from free rotational movement. In examples, the brake is configured for manual engagement or disengagement. In examples, the control circuitry is further configured to identify activation of a non-rotational testing process and engage the brake or the virtual interlock to lock the actuator from free rotational movement in response.

In some examples, the non-rotational testing process comprises an axial testing process.

As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system.

FIG. 1 is an example material testing system 100 to perform mechanical property testing. The example material testing system 100 may be, for example, a universal testing system capable of static mechanical testing. The material testing system 100 may perform, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally or alternatively, the material testing system 100 may perform dynamic testing.

The example material testing system 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106. While the example test fixture 102 is illustrated as a dual column fixture, other fixtures may be used, such as single-column test fixtures. The example test fixture 102 may include one or more of a rotary drive system 101 to rotate the material under test 106 to perform torsional material testing and/or a displacement strength testing system to apply a force to the material under test 106.

The example computing device 104 may be used to configure the test fixture 102, control the test fixture 102 and its components (e.g., testing systems 233 and/or 236, as provided in FIG. 2), and/or receive measurement data (e.g., transducer measurements such as force and displacement) and/or test results (e.g., peak force, break displacement, etc.) from the test fixture 102 for processing, display, reporting, and/or any other desired purposes. In some examples, an operator interface 107 is arranged on or near the material testing system 100. The interface 107 may present information regarding an operating mode, testing process, material information, etc., as well as accept inputs and/or commands from an operator (alternatively or in addition to the example operator interface 500).

Figure 2:
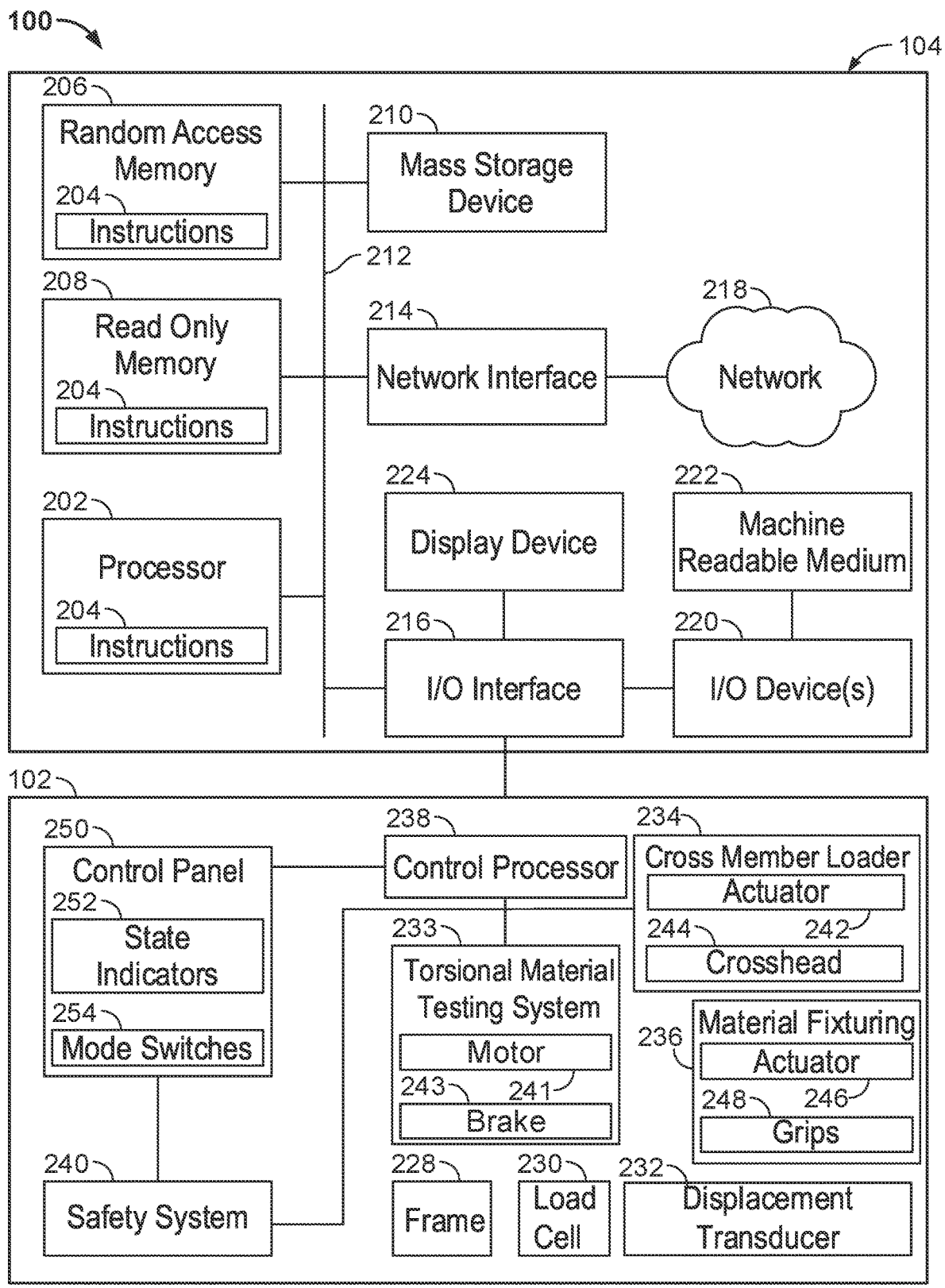
FIG. 2 is a block diagram of an example implementation of the testing device of FIG. 1, in accordance with aspects of this disclosure.

FIG. 2 is a block diagram of an example implementation of the material testing system 100 of FIG. 1. The example material testing system 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing device 104 of FIG. 2 includes a processor 202. The example processor 202 may be any general-purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing device 104 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example material testing system 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 104 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example material testing system 100 of FIG. 1 further includes the test fixture 102 coupled to the computing device 104. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 and/or to the I/O interface 216 via a wired or wireless connection (e.g., Ethernet, Wi-Fi, etc.), either directly or via the network 218.

The test fixture 102 of FIG. 2 includes a frame 228, a load cell 230, a displacement transducer 232, a torsional material testing system 233 (e.g., including rotary drive system 101), a cross-member loader 234, material fixtures 236, a control processor 238, and a safety system 240. The frame 228 provides rigid structural support for the other components of the test fixture 102 that perform the test. The load cell 230 measures force applied to a material under test by the cross-member loader 234 via the grips 248. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. The crosshead 244 couples the material fixtures 236 to the frame 228, and the motor 242 causes the crosshead to move with respect to the frame to position the material fixtures 236 and/or to apply force to the material under test.

In some examples, a torsional testing system 233 is additionally or alternatively included. The torsional testing system 233 includes a rotational motor 241 (or other actuator) and is configured to rotate the grips 236, causing the crosshead to rotate with respect to the frame 228 to position the material fixtures 236 and/or to apply force to the material under test. The rotational motor 241 and/or other components of the torsional testing system 233 may be manually configured, controlled via manual input, and/or automatically controlled by the control processor 238. The crosshead 244 and the grips 236 are operator-accessible components. Example actuators that may be used to provide force and/or motion of a component of the material testing system 100 include electric motors, pneumatic actuators, hydraulic actuators, piezoelectric actuators, relays, and/or switches.

Example grips 236 include compression platens, jaws, or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The example control processor 238 communicates with the computing device 104 to, for example, receive test parameters from the computing device 104 and/or report measurements and/or other results to the computing device 104. For example, the control processor 238 may include one or more communication or I/O interfaces to enable communication with the computing device 104. The control processor 238 may control the torsional testing system 233 to increase or decrease an applied rotational force, rotational speed of the actuator, number of revolutions, and/or an angle of rotation from the rotational motor 241. In some examples, the control processor 238 controls the cross-member loader 234 to increase or decrease applied force, control the fixture(s) 236 to grasp or release a material under test, and/or receive measurements from the displacement transducer 232, the load cell 230 and/or other transducers.

The example safety system 240 provides an additional layer of monitoring and control to the test fixture 102. The safety system 240 monitors operator inputs and the state of the test fixture 102. In the example of FIG. 2, the safety system 240 restricts operation of the test fixture 102 by the user so that the test fixture 102 is only controllable by the user when the machine is in an appropriate state. In response to detecting one or more conditions, the safety system 240 will automatically cause the test fixture 102 to go to a restricted state (e.g., a restricted setup state, disable all power and motion that could present a hazardous condition, etc.).

The safety system 240 selectively adds, removes, increases, and/or decreases restrictions on operation of the material testing system based on monitoring input signals from the material testing system 100, input signals from the safety system 240, and/or control signals from the control processor 238. The safety system 240 controls operation of the material testing system 100 by determining a state, from multiple predetermined states, in which the material testing system 100 is to be operated at any given time. Example predetermined states include one or more restricted states, in which one or more operations of the material testing system 100 are restricted (e.g., disabled, limited, etc.) and one or more unrestricted states, in which the restrictions of the restricted states are reduced and/or removed. In the example of FIG. 2, the safety processor 240 attaches to and/or interrupts the control of the torsional testing system 233 and/or the fixture(s) 236 by the control processor 238. In some other examples, the safety system 240 may directly control the torsional testing system 233 and/or the cross-member loader 234 and/or the fixture(s) 236 while enforcing any applicable restrictions on the actuators.

Example restricted states include a setup state, caution state and a disabled state. In the setup state, the safety system 240 restricts one or more actuators (e.g., the motor 241 and/or the grip actuator(s) 246), and controls (or permits control of) the actuators in response to operator inputs. Example restrictions on the motor 241 includes an upper rotational speed limit of the actuator, limiting a number of revolutions of the actuator, and/or limiting an angle of rotation of the actuator relative to the test fixture 102. In the disabled state, the safety system 240 restricts the actuators and the control processor 238 does not control the actuator in response to operator inputs (e.g., does not attempt to control the motor 241, or is prevented from controlling the motor 241 via de-energization).

Example unrestricted states include a testing state. In the example testing state, the safety system 240 reduces restrictions on the actuator (e.g., motor 241), while the control processor 238 controls the actuator(s) to perform testing (e.g., in accordance with a material testing procedure or program executed by the control processor 238). In the testing state, the control processor 238 may control the actuator(s) to perform actions such as jogging of the rotational motor 241, for which the operator should not be physically proximate the crosshead 244 and/or the pneumatic grips 248.

The example material testing system 100 of FIG. 2 may further include one or more control panels 250, including multiple state indicators 252 and one or more mode switches 254. The mode switches 254 may include buttons, switches, and/or other input devices located on an operator control panel. For example, the mode switches 254 may include buttons that control the motor 241 to jog (e.g., change rotational position) of the material under test via the grips 248, a mode control button that is depressed in conjunction with another button to enable the safety system 240 to permit operation in an unrestricted state, and/or any other input devices that could result in operation in an unrestricted state.

The state indicators 252 correspond to a set of predetermined states (e.g., the disabled, setup, caution, and testing states described above) to which the safety system 240 can set the material testing system 100. As described in more detail below, the safety system 240 controls the state indicators 252 to provide an indication as to the present state of the material testing system 100 as determined by the safety system 240. The state indicators 252 may include lights, displays, audio, mechanical systems, and/or any other indication that can be identified by the operator.

Figure 3:
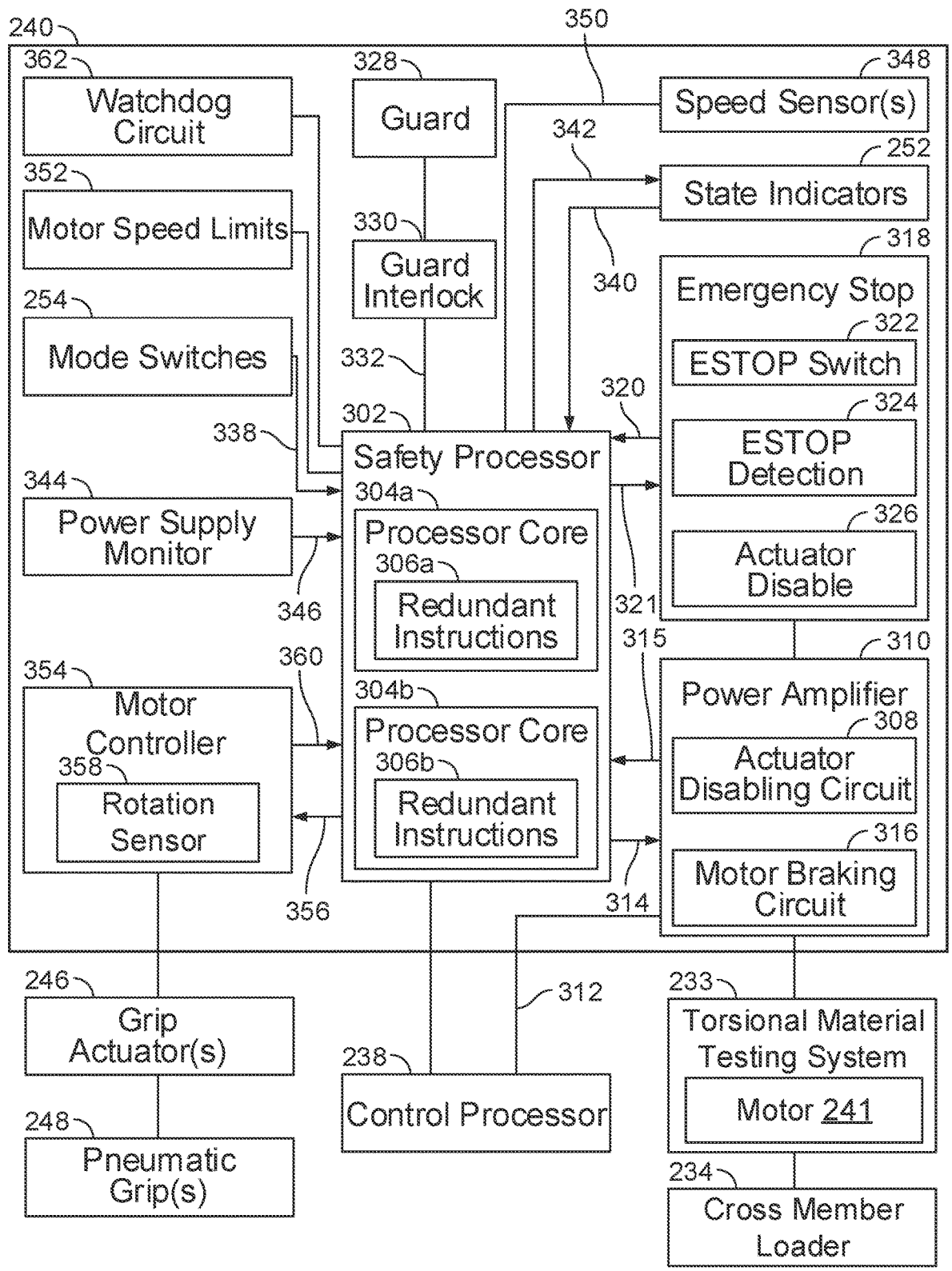
FIG. 3 is a block diagram of an example implementation of the safety system of FIG. 2, in accordance with aspects of this disclosure.

FIG. 3 is a block diagram of an example implementation of the safety system 240 of FIG. 2. As illustrated in FIG. 3, the safety system 240 includes a safety processor 302.

The example safety processor 302 includes multiple, redundant processing cores 304a, 304b. The processing cores 304a, 304b execute redundant instructions 306a, 306b and receive redundant inputs, such that the processing cores 304a, 304b should, during normal operation of the test fixture 102, produce substantially identical outputs. The safety processor 302 (e.g., via the redundant cores 304a, 304b) monitors the plurality of inputs and determines the state of the material testing system 100 based on the inputs. The safety processor 302 may compare outputs of the redundant instructions 306a 306b and control the state of the material testing system 100 based on the comparison of the outputs.

The example safety processor 302 and/or the redundant processing cores 304a, 304b may be include general purpose central processing unit (CPU) from any manufacturer. In some examples, the safety processor 302 and/or the redundant processing cores 304a, 304b may include one or more specialized processing units, such as RISC processors with an ARM core, graphic processing units, digital signal processors, and/or system-on-chips (SoC). The safety processor 302 and/or the redundant processing cores 304a, 304b execute machine readable instructions, such as the redundant instructions 306a, 306b that may be stored locally at the processor (e.g., in an included cache or SoC), in a storage device such as a random access memory, a read only memory, and/or a mass storage device.

The redundant processing cores 304a, 304b and the redundant instructions 306a, 306b allow redundant and/or diverse inputs and outputs to be processed by the safety system 240, which provides a highly reliable and predictable system. Thus, while representative inputs and outputs are illustrated in FIG. 3, these inputs and/or outputs may be duplicated to support the redundant processing cores 304a, 304b and the redundant instructions 306a, 306b. The redundant instructions 306a, 306b (e.g., embedded software, operating system, and generated code) execute by the safety processor 302 is compliant with the processes outlined in international standards, including but not limited to ISO 13849-1, which pertains to "Safety Related Parts of Control Systems." While the example safety processor 302 includes multiple, redundant processing cores, in other examples the safety processor 302 may include a single processing core, or multiple, non-redundant processing cores.

The safety system 240 of FIG. 3 further includes an actuator disabling circuit 308 (e.g., a virtual interlock) that selectively disables operation of the torsional testing system 233. For example, engagement of the actuator disabling circuit 308 may disable a power amplifier 310 from providing energy to the motor 241 of the torsional testing system 233. Additionally or alternatively, the actuator disabling circuit 308 (or another actuator disabling circuit) may disable the grip actuator(s) 246 from providing energy to the pneumatic grip(s) 248. The power amplifier 310 receives input power and outputs power to the motor 242 to control movement of the motor 241. The example actuator disabling circuit 308 and the power amplifier 310 may be implemented using a safety rated Safe Torque Off (STO) high-reliability servo power amplifier. The control processor 238 may control the motor 241 and rotational movement of the crosshead 244 via a motor control signal 312 to the power amplifier 310.

In response to an STO signal 314 from the safety processor 302, the actuator disabling circuit 308 disables the connected actuator (e.g., the rotational motor 241). For example, the actuator disabling circuit 308 may disconnect all energy to the motor 241 (and/or other moving parts in the material testing system 100), in less than a certain predefined period of time. The example actuator disabling circuit 308 may provide an STO feedback signal 315 to the safety processor 302, which indicates whether the actuator disabling circuit 308 is currently disabling the actuator. The safety processor 302 may compare the STO signal 314 to the STO feedback signal 315 to detect faults.

In the example material testing system 100, movement of the rotational motor 241 and any internal components is stopped after activation of the STO signal 314 as specified by international standards. Most of the subsystems of the safety system 240 disclosed herein activate the actuator disabling circuit 308 to safely stop rotational movement of the material fixturing system 236 and/or the material under test. Additionally, the power amplifier 310 may include a motor braking circuit 316 to decelerate the motor 241 before applying the STO signal 314. The motor braking circuit 316 allows the motor 242 to stop in a more controlled manner by eliminating continued movement by mechanical inertia after shutting down drive power. Using pre-disabling braking reduces or minimizes the motion of the crosshead 244 after the motor 241 is de-energized. Thus, the example actuator disabling circuit 308 and the motor braking circuit 316 provide a Category 1 stop as defined in the IEC 60204-1 standard, which is the "Electrical Safety Standard for Machinery."

The example safety processor 302 monitors the motor 241 and/or the motor braking circuit 316 while pre-disabling braking is occurring to confirm that the motor 241 is braking. If the safety processor 302 determines that the motor 241 is not slowing down during the braking, then the safety processor 302 performs a braking failure mitigation to cease the braking and immediately de-energize the motor 241. By implementing braking failure mitigation to the two-stage disabling sequence, the safety processor 302 may shorten stopping distance in situations in which the braking is ineffective. While the shortest stopping distance occurs when the pre-disabling braking is operative, when the pre-disabling braking is not completely operative, then a two-stage sequence involving an inoperative pre-disabling braking can have a longer stopping distance than a single-stage sequence (e.g., only disconnection). A secondary advantage of braking failure mitigation is that the mitigation enables more flexibility in implementing the two-stage disabling sequence, in that a wider range of components and systems can be used for high-performance braking with a braking failure mitigation process that can catch failures with the braking system.

The example safety system 240 further includes an emergency stop 318 (e.g., a button, a switch, etc.) that provides an emergency stop input signal 320 to the safety processor 302. The emergency stop 318 may be a manually operated emergency stop button, which is a complementary-type safety function. The emergency stop 318 includes two channel redundancy for signaling. The emergency stop 318 may include an emergency stop switch 322, emergency stop detection circuits 324, and an actuator disabling circuit 326. The emergency stop 318 is independently controllable using the hardware and embedded software of the safety processor 302. For example, in response to detecting the emergency stop input signal 320 from the emergency stop detector 324, the safety processor 302 sets the state of the material testing system 100 to the disable state and provides an emergency stop output signal 321 to the emergency stop 318 (e.g., to the emergency stop switch 322).

The emergency stop switch 322, in response to the emergency stop output signal 321, controls the actuator disabling circuit 326 to control the actuator disabling circuit 314 and/or the motor braking circuit 314 to stop the motor 241 (e.g., via motor break 243). The example actuator disabling circuit 326 may have a first connection to the motor braking circuit 314, and second redundant connections to the actuator disabling circuit 308. When the actuator disabling circuit 326 is triggered, the actuator disabling circuit 326 activates the motor braking circuit 314, delays for a time to permit the braking to occur, and then activates the actuator disabling circuit 308 to de-energize the applicable actuator.

In addition or as an alternative to control via the safety processor 302, the emergency stop switch 322 may directly actuate the actuator disabling circuit 308 within the power amplifier 310, such as by physical interruption of the STO signal 314 between the safety processor 302 and the actuator disabling circuit 308. The safety processor 302 monitors the emergency stop detection circuits 324 and acts as a redundant monitor to the hardware. The safety processor 302 outputs the STO signal 314 to control the actuator disabling circuit 308 to continue to disable the motor 241 so that, when the emergency stop switch 322 is released, the material testing system 100 will remain disabled (e.g., in a restricted state) and require user interaction to re-enable operation of the motor 241.

The example material testing system 100 (e.g., the test fixture 102) is compatible with interlock guarding systems with redundant or diverse contacts. The example safety system 240 may include one or more guards 328 and guard interlocks 330 configured to provide physical and/or virtual barriers to operator access to the material testing system 100 while operating in an unrestricted state. For example, the guards 328 may include physical barriers that are opened and closed to control access to the volume around the pneumatic grips 248 and/or the crosshead 244 (and/or other moving components). In some examples, the guard 328 includes a motor brake 243, which is configured for manual and/or automatic engagement. For instance, the motor brake 243 may be engaged by an operator and/or the safety system 240 to physically prevent rotation of the motor 241. Example physical barriers include guard doors, which may use redundant safety switches to monitor whether the doors guarding the protected volume are open or closed. Each door switch has mechanically linked normally open and normally closed contacts, which may be dynamically pulsed (e.g., by the guard interlocks 330) and/or otherwise received as inputs. Pulsing permits plausibility diagnostic checking of the guard door switches in real time.

Additionally or alternatively, the guards 328 may include virtual guards that monitor the volume around the pneumatic grips 248 and/or the crosshead 244 for intrusion into the volume. Example virtual guards may include light curtains, proximity sensors, and/or pressure pads. While virtual guarding does not physically prevent access, the virtual guarding outputs guarding signals to the guard interlocks 330, which output interlock signals 332 to the safety processor 302 and/or actuator disabling circuit 308 (e.g., similar to the emergency stop switch 322 discussed above).

The interlocks 330 may trigger the actuator disabling circuit 308 to de-energize the motor 242. In some examples, the safety processor 302 controls re-enabling of the power amplifier 310 when the guard interlocks 330 are no longer triggered, in a similar manner as the emergency stop switch 322 discussed above.

Additionally or alternatively, the example safety system 240 may default to a restricted "setup" state when an operator enters the protected volume of the material testing system 100, thereby disabling or de-energizing actuators of the system 100.

The example safety system 240 includes multiple state indicators 252 and mode switches 254. The example safety processor 302 monitors the mode switches 254 by, for example, dynamically pulsing the mode switches 254 to generate or obtain mode switch input signals 338 (e.g., one or more mode switch inputs for each of the mode switches 254). In some examples, the mode switches 254 are high-reliability switches. The safety processor 302 may test the mode switches 254 for short circuits or other faulty conditions periodically, aperiodically, in response to events (e.g., at startup of the material testing machine), on a predetermined schedule, and/or at any other times.

The example safety processor 302 controls the state indicators 252 to indicate the state of the material testing system 100 to the operator. For example, the safety processor 302 may output indicator signals 342 to the state indicators 252. If the state indicators 252 are lights, the output indicator signals 342 may, for example, control each of the lights to be on, off, flashing, and/or any other output for the lights. In some examples, the safety processor 302 determines the conditions of the indicators via indicator feedback signals 340. Example indicator feedback signals 340 may indicate to the safety processor 302 whether each of the state indicators 252 is on, off, short-circuited, open-circuited, and/or any other status or condition of the state indicators 252. If the processor determines that one or more of the state indicators 252 are not in the commanded proper state, the safety processor 302 controls the material testing system to be in a restricted state provides a notification to the operator (e.g., via the control panel 250 or other notification).

The safety system 240 includes a power supply monitor 344 to monitor the power supplies (e.g., DC and AC power supplies) that provide power to components of the material testing system 100. The power supply monitor 344 provides one or more power supply status signals 346 to the safety processor 302 and/or to the watchdog circuit 362 (described below) to indicate whether the monitored power supplies are within respective voltage and/or current ranges. If the power supply monitor 344 determines that one or more of the power supplies are out of tolerance, the safety processor 302 and/or to the watchdog circuit 362 may disable the material testing system 100 and alert the operator.

The example safety system 240 further includes one or more speed sensor(s) 348. The example speed sensor(s) 348 may be integrated, redundant, and/or diverse speed monitoring sensors. The speed sensor(s) 348 provide speed signal(s) 350, which are representative of the crosshead speed, to the safety processor 302. The safety processor 302 monitors the speed signal(s) 350 to ensure the motor 241 does not exceed an upper speed limit (e.g., motor speed limit(s) 352) as determined by the current operating mode of the machine. For example, the value of the upper speed limit may depend on whether the material testing system 100 is in a restricted state or an unrestricted state. In some examples, two speed sensors that operate on different principles may be used in the material testing system 100 to prevent the sensors 348 from sustaining common cause failures. The speed signal 350 of each speed sensor 348 is read and compared by the safety processor 302 to verify that the speed signals 350 are in agreement. If one speed sensor 348 indicates a different speed than another speed sensor 350, the safety processor 302 disables the material testing system 100 (e.g., via the actuator disabling circuit 308).

The example motor movement limit(s) 352 may include a speed and/or rotational limit that specifies a limit on the rotational speed or angle of the motor 241. When the motor movement limit(s) 352 is reached, the safety processor 302 stops the motion of the motor 241. In some examples, the motor movement limit(s) 352 are multi-level limits, where the number of limits that are triggered indicate how far the motor movement limit(s) 352 have been exceeded. In some examples, a first level limit is handled by the safety processor 302 to stop operation of the applicable actuator (or all actuators), such as the motor 241. As the motor 241 continues to move beyond the first level limit and hits a second level limit (e.g., farther outside of the acceptable range than the first level limit), the motor movement limit 352 may trigger a direct connection (e.g., a hardware connection) to the actuator disabling circuit 308 and/or the motor braking circuity 316, and/or to the actuator disabling circuit 326, to trigger the two phase disabling of the motor 242.

When the safety processor 302 is controlling the material testing system 100 in a restrictive state (e.g., during the disable, caution, or setup state), the safety processor 302 disables the motor 241. Conversely, when the safety processor 302 is controlling the material testing system 100 in the testing state, the safety processor 202 provides a control signal 356 to cause the motor controller 354 to enable the motor 241 to rotate test specimens during testing. The example motor controller 354 may monitor the torsional testing system 233 (e.g., via rotation sensor(s) 358) to ensure the motor 241 operates within the predetermined restrictions and/or desired operating parameters. The motor controller 354 feeds the rotational signals 360 to the safety processor 302 to verify that the commanded speeds, force, angles, etc., are being enforced.

In some examples, the motor controller 354 is controlled via an operator input using a foot pedal switch. For example, the foot pedal switch may include separate switches to activate rotation and to deactivate rotation of the motor 241. The switches may be mechanically linked switches, which may be dynamically pulsed to check for plausibility between the switches and/or to monitor for potential faults in the switches (e.g., electrical faults).

The safety processor 302 further controls the motor controller 354 to de-energize the motor 241 when power is disabled to the material testing system 100. For example, the safety processor 302 may control the motor 241 (e.g., via one or more programs, circuits, etc.) to enable activation when powered, but to be normally deactivate the actuators such that the motor 241 is prevented from rotating when the material testing system 100 is unpowered.

The example safety system 240 further includes a watchdog circuit 362. The watchdog circuit 362 communicates with the safety processor 302 periodically, aperiodically, in response to one or more events or triggers, and/or at any other time to verify the operation of the safety processor 302. For example, the safety processor 302 may communicate a heartbeat signal, or a response to a challenge from the watchdog circuit 362, to indicate to the watchdog circuit 362 that the safety system 240 is operating properly. If the watchdog circuit 362 does not receive an expected signal from the safety processor 302, the watchdog circuit 362 disables the material testing system 100 and notifies the operator.

The example safety processor 302, the example emergency stop 322, the example guard interlock 330, the example motor speed limit(s) 352, and/or the example watchdog circuit 362 are coupled (e.g., connected via hardware) to the actuator disabling circuit 326. When any of the safety processor 302, the emergency stop 322, the guard interlock 330, the crosshead travel limit(s) 352, and/or the watchdog circuit 362 determine that a respective condition is satisfied so as to disable the material testing system 100 (e.g., activation of the emergency stop switch 322, tripping of the guard 328, exceeding a rotational movement limit 352, and/or triggering of the watchdog circuit 362), the actuator disabling circuit 326 is used to activate the motor braking circuit 316 and the actuator disabling circuit 308. The safety processor 302 may determine that the state of the material testing system 100 is the disabled state.

While the example control processor 238 and the safety processor 302 are illustrated as separate processors, in other examples the control processor 238 and the safety processor 302 may be combined into a single processor or set of processors that are not divided into control and safety functions. Furthermore, the control processor 238, the safety processor 302, and/or combined processors may include non-processing circuitry, such as analog and/or digital circuitry to perform one or more specialized functions.

Figure 4A:
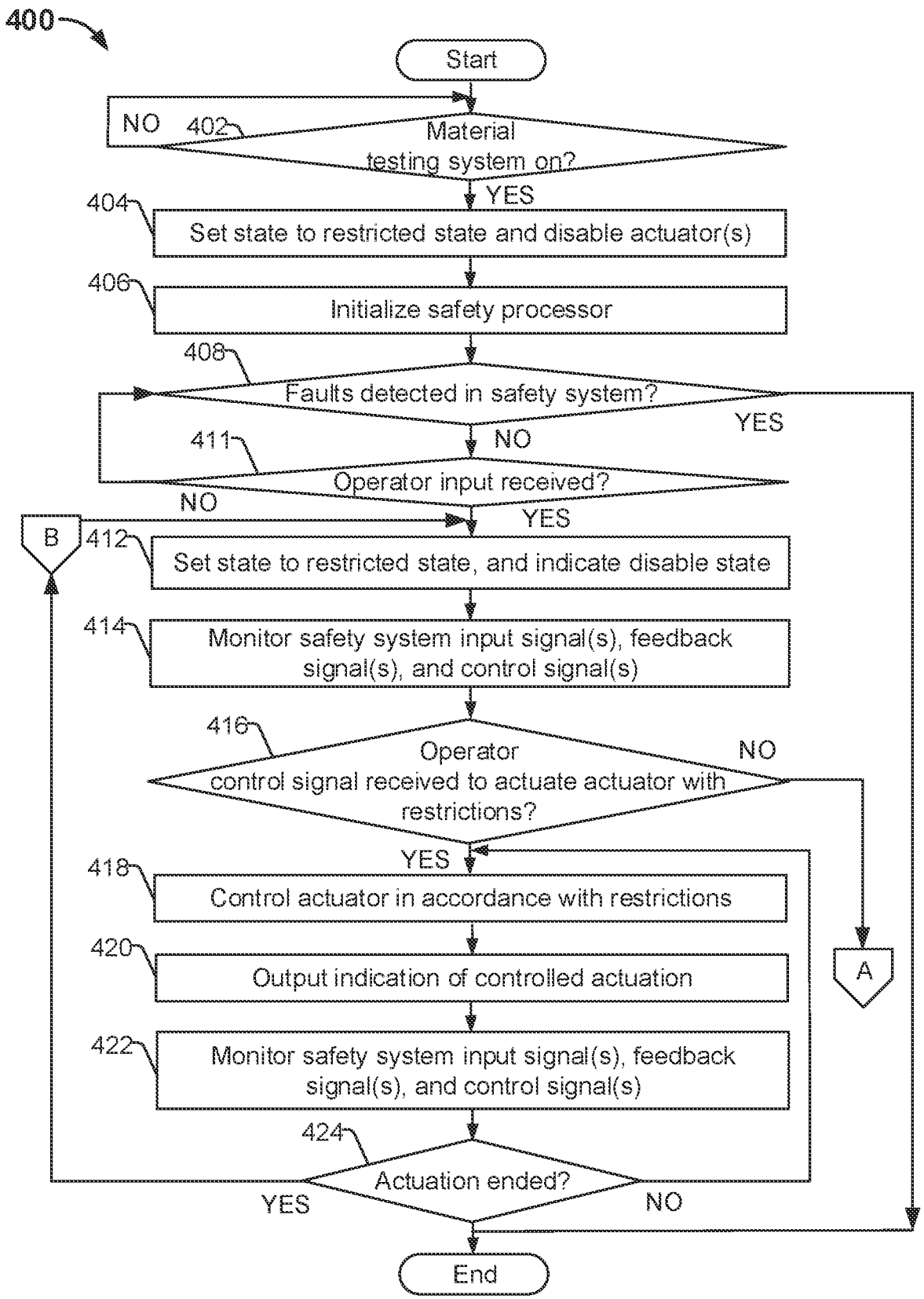
FIGS. 4A and 4B show flowcharts representative of example machine readable instructions which may be executed by the safety processor of FIG. 3 to control states of the material testing system of FIGS. 1-3, in accordance with aspects of this disclosure.
Figure 4B:
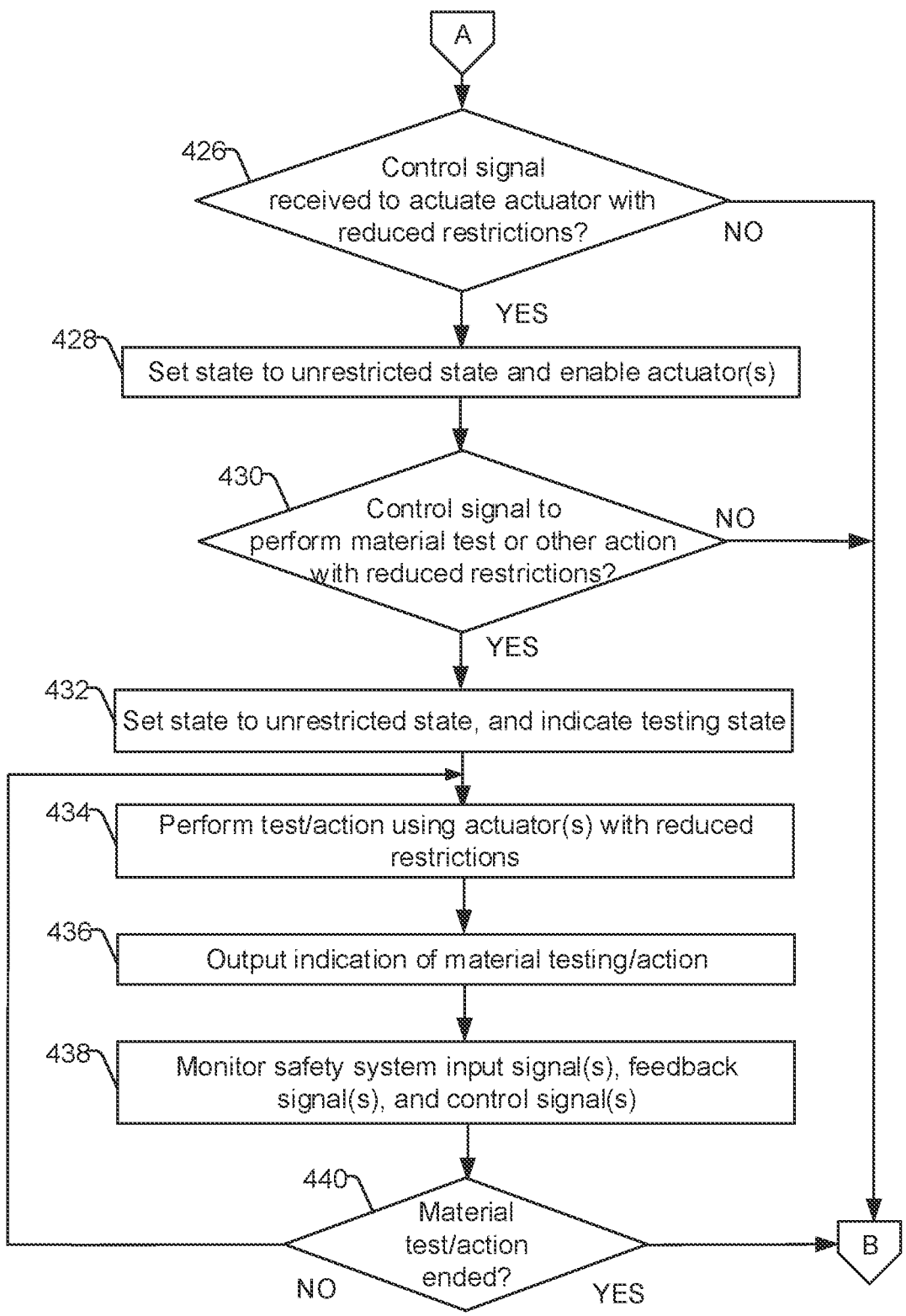

FIGS. 4A and 4B show a flowchart representative of example machine readable instructions 400 which may be executed by the safety processor 302 of FIG. 3 to control states of the torsional material testing system of FIGS. 1-3. The example instructions 400 may be executed to determine a state of the material testing system from a plurality of predetermined states, enforce restrictions on the actuator (e.g., motor 241), and automatically set the state of the torsional material testing system to the restricted state (and/or one of the restricted state subgroups) in response to completion of an action involving controlling the actuator.

At block 402, the material testing system 100 and/or one or more subsystems may be powered on. If the material testing system 100 is not powered on, block 402 iterates until the material testing system 100 is turned on. When the material testing system 100 is powered on (block 402), at block 404 the safety system 240 sets the state of the material testing system 100 to a disabled state and disables one or more actuator(s) (e.g., the rotational motor 241, the grip actuator(s) 246). For example, the safety system 240 may default the actuator disabling circuit 308 to de-energizing the motor 241.

At block 406, the safety processor 302 is initialized. For example, the safety processor 302 may perform fault checks (e.g., checking inputs, outputs, and/or attached devices for open circuits and/or closed circuits), redundancy checks (e.g., determining that redundant inputs and/or redundant outputs are in agreement), and/or other initialization processes.

At block 408, the safety processor 302 determines whether any faults are detected in the safety system 240 (e.g., detected during the initialization process). If faults are detected (block 408), the safety processor 302 outputs a fault alert (e.g., via the control panel 250, via the computing device 104, etc.). The example instructions 400 may then end.

When faults are not detected (block 408), at block 411 the safety processor 302 determines whether an operator input has been received to transition the material testing system 100 from the disabled state to a setup state. For example, the safety processor 302 may require one or more specified inputs (e.g., pressing an unlock button) to transition from the disabled state. If the operator input has not been received (block 411), block 411 iterates while the material testing system 100 remains in the disabled mode to await the operator input.

When the operator input is received (block 411), at block 412 the safety processor 302 sets the state of the material testing system 100 to a setup state. In accordance with setting the setup state, the safety processor 302 enables the actuator(s) (e.g., the motor 241), restricts the actuator(s), and indicates the state as disabled (which may include one or more subgroups, such as a setup or caution state, indicated, e.g., via the state indicators 252). In some examples, the safety processor 302 controls one or more visual indicators on the control panel 250 to selectively emphasize corresponding ones of the operator selectable inputs (e.g., mode switches 254) based on the state of the material testing system 100 being the disabled or restricted state. For example, the safety processor 302 may control the visual indicators to emphasize the inputs that may be used by the operator in a setup mode (e.g., manual rotation of the rotational drive system 101) and deemphasize the inputs that may not be used in the setup mode (e.g., jogging function).

At block 414, the safety processor 302 monitors input signals of the safety system 240 (e.g., sensor signals 320, 332, 338, 346, 350), feedback signals (e.g., feedback signals 315, 340, 360), and/or control signals (e.g., signals from the control processor 238). The safety processor 302 may monitor the signals to, for example, identify operator commands and/or conditions that would cause the safety processor 302 to recognize a change in the state of the torsional material testing system 233.

At block 416, the safety processor 302 and/or the control processor 238 determine whether an operator control signal has been received to actuate the actuator(s) with restrictions (e.g., at a low speed or pressure), thereby entering into an unrestricted (or lower restriction) state (e.g., the testing state) but without performing a testing process. For example, the operator may select one or more mode switches 254 to rotate the crosshead 244 at a low jogging speed via the motor 241. If an operator control signal has been received to actuate an actuator (block 416), at block 418 the control processor 238 controls the actuator in accordance with restrictions (e.g., speed restrictions, force restrictions, operator clearance restrictions) applied by the safety processor 302.

At block 420, the safety processor 302 outputs an indication of the controlled actuation. For example, the safety processor 302 may control one or more of the state indicators 252 to flash, cause the computing device 104 to output an indication of the actuation, and/or provide any other indication(s).

At block 422, the safety processor 302 monitors the input signals of the safety system 240 (e.g., sensor signals 320, 332, 338, 346, 350), feedback signals (e.g., feedback signals 315, 340, 360), and/or control signals (e.g., signals from the control processor 238). At block 424, the safety processor 302 determines whether the actuation has ended. For example, the safety processor 302 may pulse the mode switches 254 to determine whether one or more of the operator controls signals has changed, and/or monitor input signals and feedback signals to identify triggering of guards and/or interlocks, faults, and/or any other event that would cause an interruption of the actuation. If the actuation has not ended (block 418), control returns to block 418 to continue to control the actuator. When the actuation has ended (block 424), the safety processor 302 returns control to block 412.

Turning to FIG. 4B, if an operator control signal has not been received to actuate the actuator(s) (block 416), at block 426 the safety processor 302 and/or the control processor 238 determine whether an operator control signal has been received to actuate the actuator(s) with reduced restrictions (e.g., to perform a testing process at a high speed or pressure). For example, operator inputs may be received to enter into the testing state and performing a test. If an operator control signal has not been received to actuate the actuator(s) with reduced restrictions (block 426), control returns to block 412.

If an operator control signal has been received to actuate the actuator(s) with reduced restrictions (block 426), at block 428 the safety processor 302 sets the state of the material testing system 100 to the testing state, the grip actuator(s) 246, and reduces the actuator restriction(s). In some examples, the safety processor 302 enables the motor 241 and/or the grip actuator(s) 246 to be controlled by the control processor 238 in the testing state. The example safety processor 302 further controls the state indicators 252 to indicate that the material testing system 100 is in the testing state.

At block 430 the safety processor 302 and/or the control processor 238 determine whether an operator control signal has been received to initiate performance of a torsional material test (e.g., with reduced restrictions) and/or another action with reduced restrictions (e.g., high speed jogging of the crosshead 244). For example, operator inputs and/or inputs from the computing device 104 may be received to perform a programmed material test involving high rotational forces.

If an operator control signal has been received to perform a torsional strength material test and/or another action (block 430), at block 432 the safety processor 302 sets the state of the material testing system 100 to the testing state, and enables the actuator(s) (e.g., the motor 241, the grip actuator(s) 246). The example safety processor 302 further controls the state indicators 252 to indicate that the material testing system 100 is in the testing state.

At block 434 the control processor 238 controls the actuator to perform the programmed test and/or another action (e.g., with reduced and/or eliminated restrictions). At block 436, the safety processor 302 outputs an indication of the ongoing material testing. For example, the safety processor 302 may control one or more of the state indicators 252 to flash, cause the computing device 104 to output an indication of the unrestricted actuation, and/or provide any other indication(s).

At block 438, the safety processor 302 monitors the input signals of the safety system 240 (e.g., sensor signals 320, 332, 338, 346, 350), feedback signals (e.g., feedback signals 315, 340, 360), and/or control signals (e.g., signals from the control processor 238). At block 440, the safety processor 302 determines whether the torsional strength material test and/or other action has ended. For example, the safety processor 302 may pulse the mode switches 254 to determine whether one or more of the operator controls signals has changed, and/or monitor input signals and feedback signals to identify triggering of guards and/or interlocks, faults, and/or any other event that would cause an interruption of the actuation. If the actuation has not ended (block 440), control returns to block 434 to continue to perform the material test and/or other action.

When the actuation has ended (block 440), the safety processor 302 automatically changes the state to a restricted state and returns control to block 412.

Figure 5:
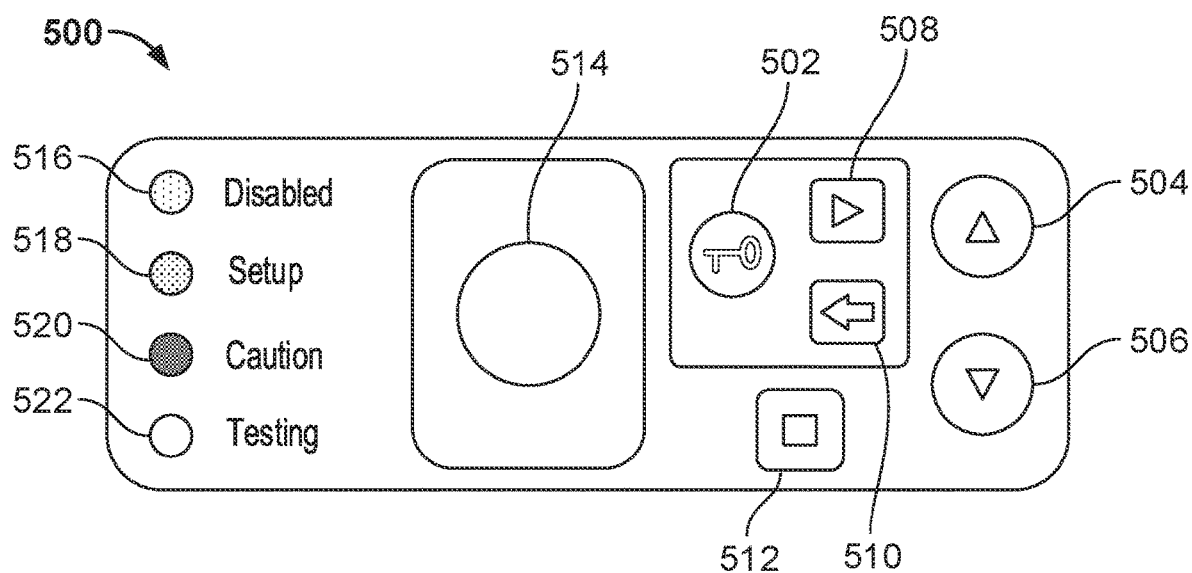
FIG. 5 illustrates an example operator interface that may be used to implement the operator interface of FIGS. 1-3, in accordance with aspects of this disclosure.

FIG. 5 illustrates an example operator interface 500 that may be used to implement the control panel 250 of FIGS. 2 and 3. The operator interface 500 may be attached to the example test fixture 102, located proximate to the text fixture (such as the operator interface 107 of FIG. 1), and/or located remotely from the test fixture 102. For example, the operator interface 500 may be implemented as a built-in operator panel or switch on a base of the test fixture 102.

The example operator interface 500 includes multiple input devices (e.g., buttons, switches, etc.) which provide inputs to the control processor 238 and/or to the safety system 240 of FIGS. 2 and/or 3. The example input devices include a state control button 502, which controls the transition from a restricted state (e.g., the disabled state, the caution state, and/or setup state) to an unrestricted state (e.g., the testing state), and may be required to be used to perform actions involving the unrestricted states. The state control button 502 may be considered as an "unlock" button or safety input that enables use of the material testing system in unrestricted states.

Jog buttons 504, 506 control the motor 241 to jog the crosshead 244 rotationally (e.g., up or down, left or right, and/or other directions based on relative orientation of the motor and crosshead). For example, the motor 241 may turn in a right-hand or left-hand rotational direction for rotational crosshead movement. When depressed individually, the jog buttons 504, 506 control the crosshead 244 to move in the right-hand and left-hand rotational directions at a low speed (e.g., determined by the safety processor 302). When a jog button 504, 506 is depressed simultaneously with the state control button 502, the safety processor 302 may reduce the speed restriction on the motor 241 and allow jogging of the crosshead 244 at higher speeds. The example jog buttons 504, 506 may serve as directional inputs. In some examples, the operator interface 500 may control the torsional material testing system as well as non-rotational testing systems, such as axial testing systems, as disclosed herein.

As used herein, received "simultaneously" refers to both inputs being activated or depressed at any given time, not necessarily that both buttons have to be initially depressed at exactly the same moment.

A start button 508 controls the control processor 238 to initiate a material test. A return button 510 controls the control processor 238 to return the crosshead 244 to a predetermined rotational position, which may be accomplished at low speed or high speed. In some examples, the safety processor 302 requires that the start button 508 and/or the return button 510 be depressed in conjunction with the state control button 502. A stop button 512 controls the control processor 238 to stop or pause a running test. An emergency stop switch 514 may be included to implement the emergency stop switch 322 of FIG. 3.

The operator interface 500 further includes state indicators 516-522 to output an indication of a present state of the material testing system 100. The example state indicators 516-522 are lights representative of each of the states of the material testing system 100 that may be determined by the safety processor 302. In the example of FIG. 5, the operator interface 500 includes a disabled state indicator 516, a setup state indicator 518, a caution state indicator 520, and a testing state indicator 522. Each of the state indicators 516-522 is lit when the safety processor 302 determines that the material testing system 100 is in the corresponding state, while the state indicators 516-522 not corresponding to the present state are unlit. Although shown as four individual indicators, the state indicators may be a single indicator (e.g., with one or more characteristics that changes in response to a change in state), or two indicators, one corresponding to a restrictive state and one corresponding to an unrestrictive state. In some examples, the state indicators represent the operating state of the material testing system 100 and all sub-systems (e.g., torsional and/or axial testing systems). In some examples, the state indicators represent the operating state of the torsional testing system or the axial testing systems. In some examples, two or more state indicators are presented, specific to a particular testing system.

Figure 6:
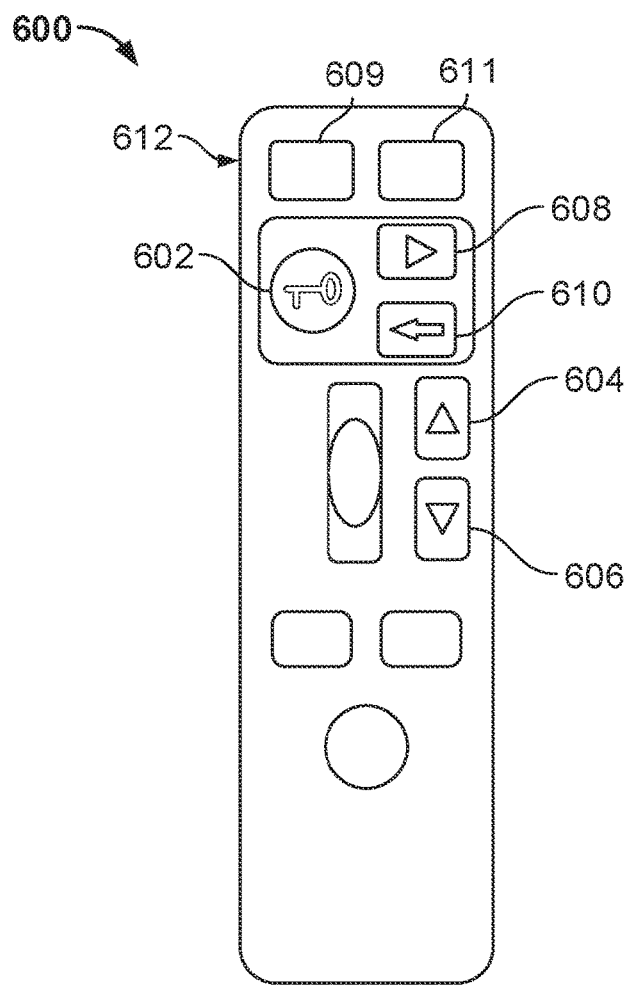
FIG. 6 illustrates another example operator interface that may be used to implement that operator interface of FIGS. 1-3, in accordance with aspects of this disclosure.

FIG. 6 illustrates another example operator interface 600 that may be used to implement that control panel 250 of FIGS. 2 and 3. The example operator interface 600 may be a handset having a limited set of input devices (e.g., buttons, switches, etc.). The operator interface 600 may be attached to the example test fixture 102, located proximate to the test fixture, and/or located remotely from the test fixture 102. The operator interface 600 includes a state control button 602 (e.g., similar or identical to the state control button 502 of FIG. 5), jog buttons 604, 606 (e.g., similar or identical to the jog buttons 504, 506), a start button 608 (e.g., similar or identical to the start button 508), and a return button 610 (e.g., similar or identical to the return button 510).

The operator interfaces 500, 600 may include custom buttons 612, which may provide additional or alternative functions to the operator. In some examples, the additional or alternative functions are subject to the restrictions of one or more of the restricted states. In the example of FIG. 6, custom button 609 is configured as a rotational jog button, whereas custom button 611 is a rotary return button, both to control the motor 241 of the torsional material testing system 233.

Figure 7:
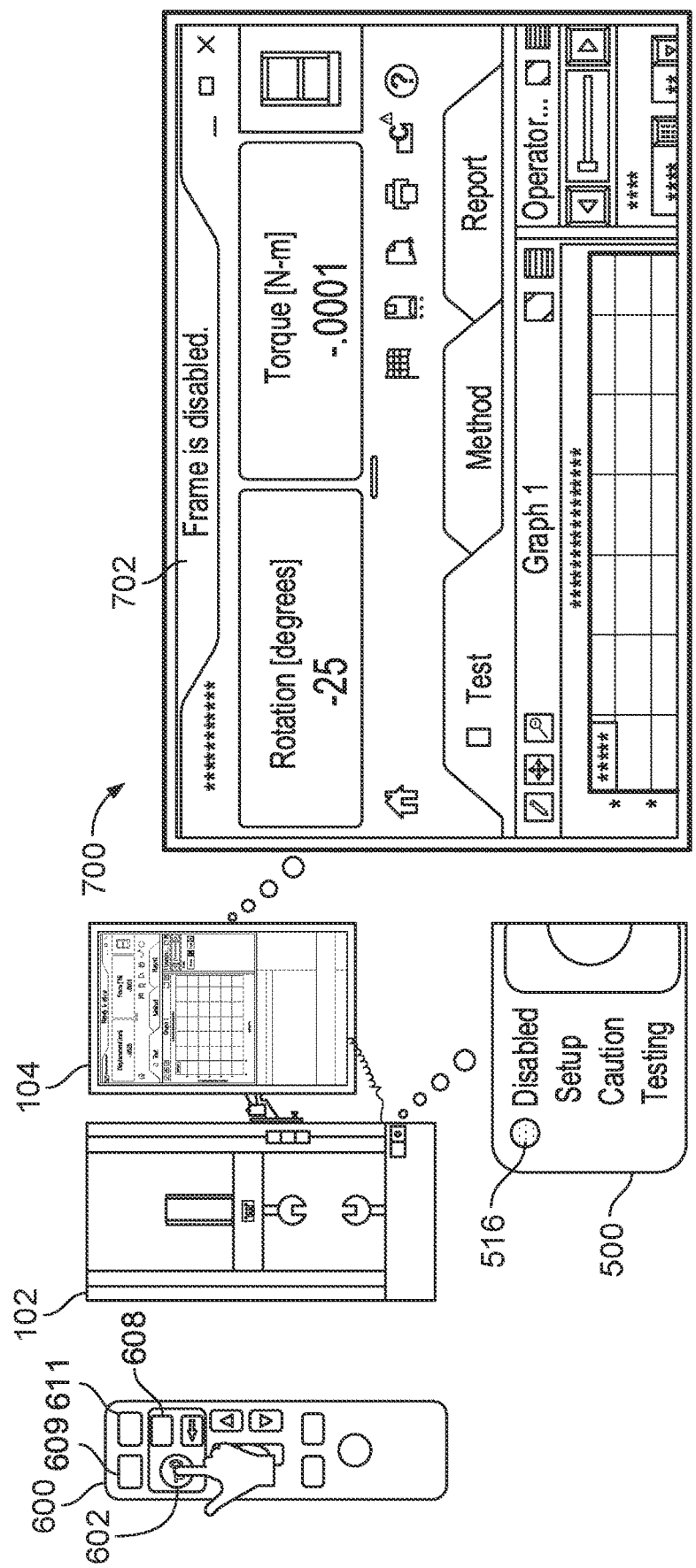
FIG. 7 illustrates the example material testing system of FIG. 1 and the operator interfaces of FIGS. 5 and 6 during a startup routine of the material test system, in accordance with aspects of this disclosure.

FIG. 7 illustrates the example material testing system 100 of FIG. 1 and the operator interfaces of FIGS. 5 and 6 during a startup routine of the material testing system 100. The material testing system 100 is powered up and initializes in the disabled state, in which the disabled indicator 516 is illuminated (e.g., white) to indicate that the material testing system is in the disabled state. In some examples, only two indicators (restricted and unrestricted) are presented, such as when the interface is directed to control of the torsional testing system 233. Additionally, a user interface 700 executing on the computing device 104, 200 of FIGS. 1 and 2 also includes a prominent action indicator 702 that the material testing system 100 is in the disabled state. The example operator interfaces 500 and 600 illuminate or emphasize only the buttons that provide a function when pressed. At the power up stage (e.g., in the disabled state), only the state control button 602 is functional. In addition to the power up event, the disabled state may occur when the emergency stop switch is triggered, when a guarding system is triggered, in response to a fault, and/or any other events to which the safety processor 302 responds by setting the state to the disabled state.

Figure 8:
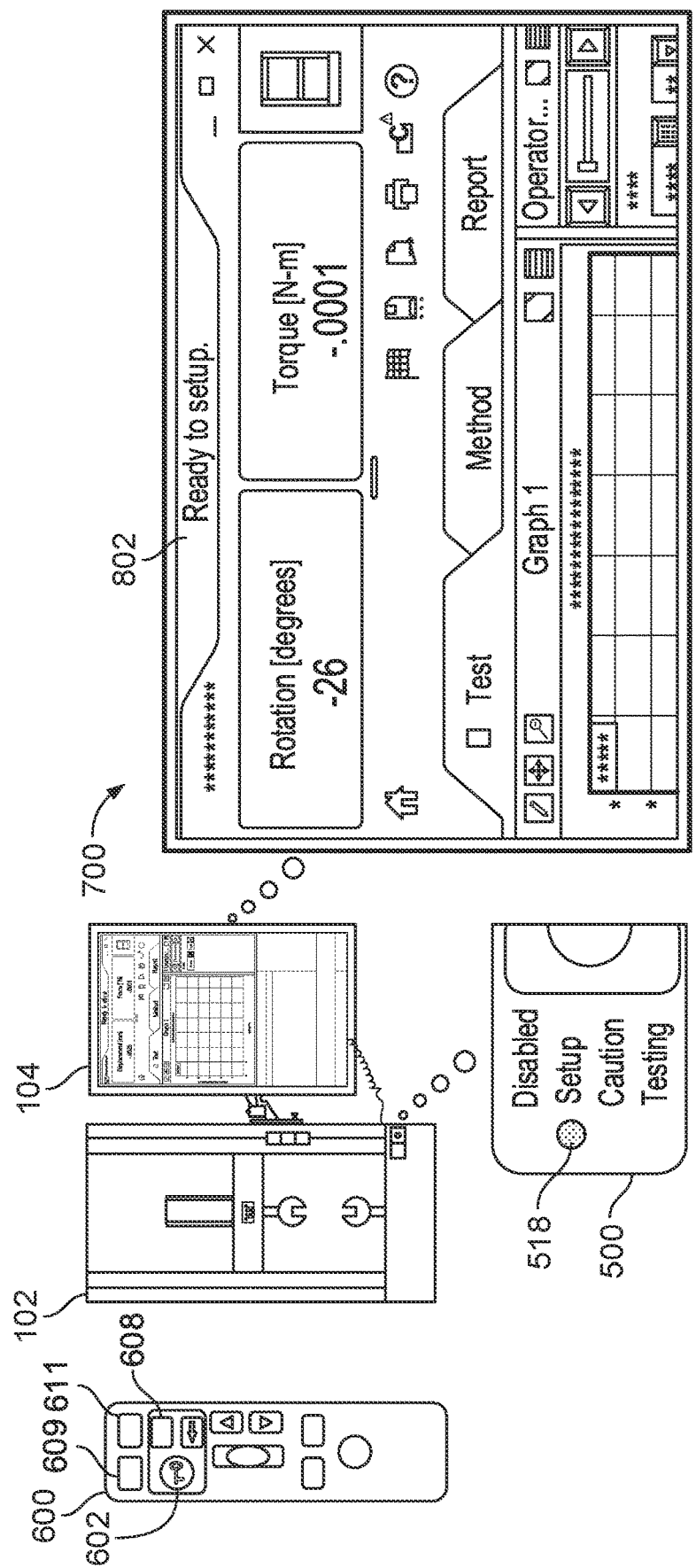
FIG. 8 illustrates the example material testing system of FIG. 1 and the operator interfaces of FIGS. 5 and 6 in the setup state of the material test system, in accordance with aspects of this disclosure.

When the operator presses the state control button 602 button, the safety processor 302 changes the system to the setup state. FIG. 8 illustrates the example material testing system 100 of FIG. 1 and the operator interfaces 500, 600 of FIGS. 5 and 6 in the setup state of the material testing system 100. After the safety processor 302 sets the state to the setup state, the safety processor 302 controls the setup indicator 518 to illuminate (e.g., blue or green) to indicate the setup state to the operator. Additionally, the user interface 700 includes a prominent indication 802 that the material testing system 100 is in the setup state (e.g., Ready to Setup). In the setup state, additional control buttons are emphasized or illuminated (e.g., Jog) to indicate that additional functions are now available. In some examples, a non-rotational testing system may be operating in the setup state (e.g., an axial testing system), while the torsional testing system 233 remains in a restricted state.

Figure 9:
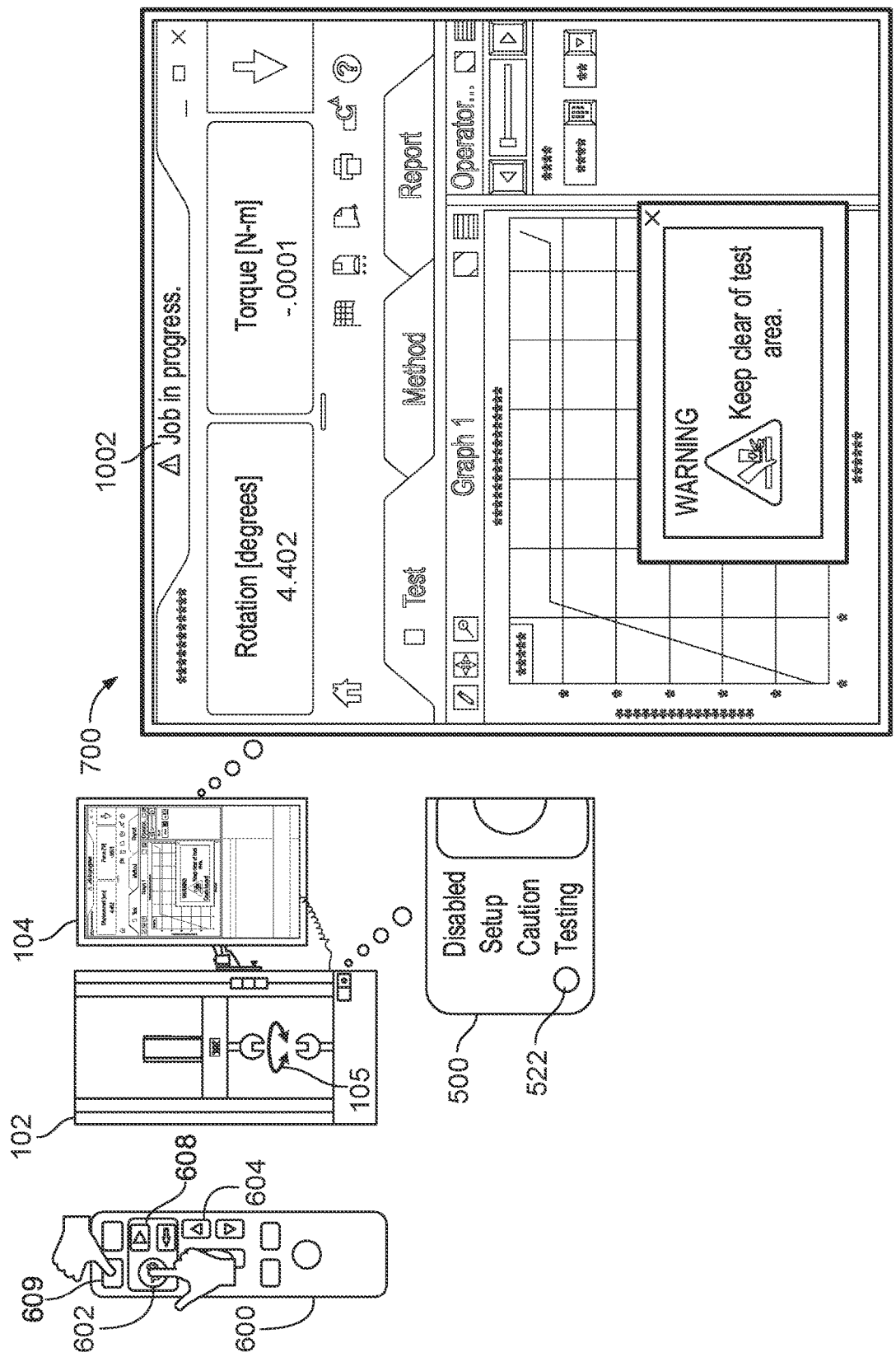
FIG. 9 the example material testing system of FIG. 1 and the operator interfaces of FIGS. 5 and 6 while jogging a rotational actuator with reduced restrictions in the caution or testing state, in accordance with aspects of this disclosure.

FIG. 9 the example material testing system 100 of FIG. 1 and the operator interfaces of FIGS. 5 and 6 while jogging the crosshead 244 with reduced restrictions in the testing state (or, in some examples, the caution state). For example, in some applications, in order to eliminate motivation to attempt to bypass the safety system 240, the safety processor 302 may reduce one or more restrictions in the testing state to allow for a rotational jog of the crosshead 244. While the material testing system 100 is in the testing state illustrated in FIG. 9, the operator may simultaneously press the state control button 602 and the jog button 609. In response to the combination of the buttons 602 and 609, the control processor 238 controls the motor 241 to rotate the crosshead 244, and the safety processor 302 sets the state of the material testing system 100 to the testing state (or, in some examples, the caution state), and reduces the restrictions applied to the motor 241. As a result, the motor 241 is permitted to rotate the crosshead in the commanded direction. The safety processor 302 will further control the testing indicator 522 (or, in some examples, the caution indicator 520) to light and/or flash, and the user interface software includes a prominent hazard indicator 1002 that the material testing system 100 is performing the jogging movement, which may include text, flashing the indication 1002 and/or the testing indicator 522 (or, in some examples, the caution indicator 520), and/or any other emphasis. In some examples, the hazard indicator 1002 may continuously display active warning label warning of a specific potential hazard.

If the operator releases the state control button 602, the jogging movement may continue with reduced restrictions in the testing state. When the operator releases the jog button 609, the control processor 238 stops the jogging movement and the safety processor 302 automatically sets the state of the material testing system 100 to the setup state and restores the restrictions. In some other examples, when the operator releases either of the state control button 602 or the jog button 609, the safety processor 302 automatically sets the state of the material testing system 100 to the setup state and restores the corresponding restrictions.

Figure 10A:
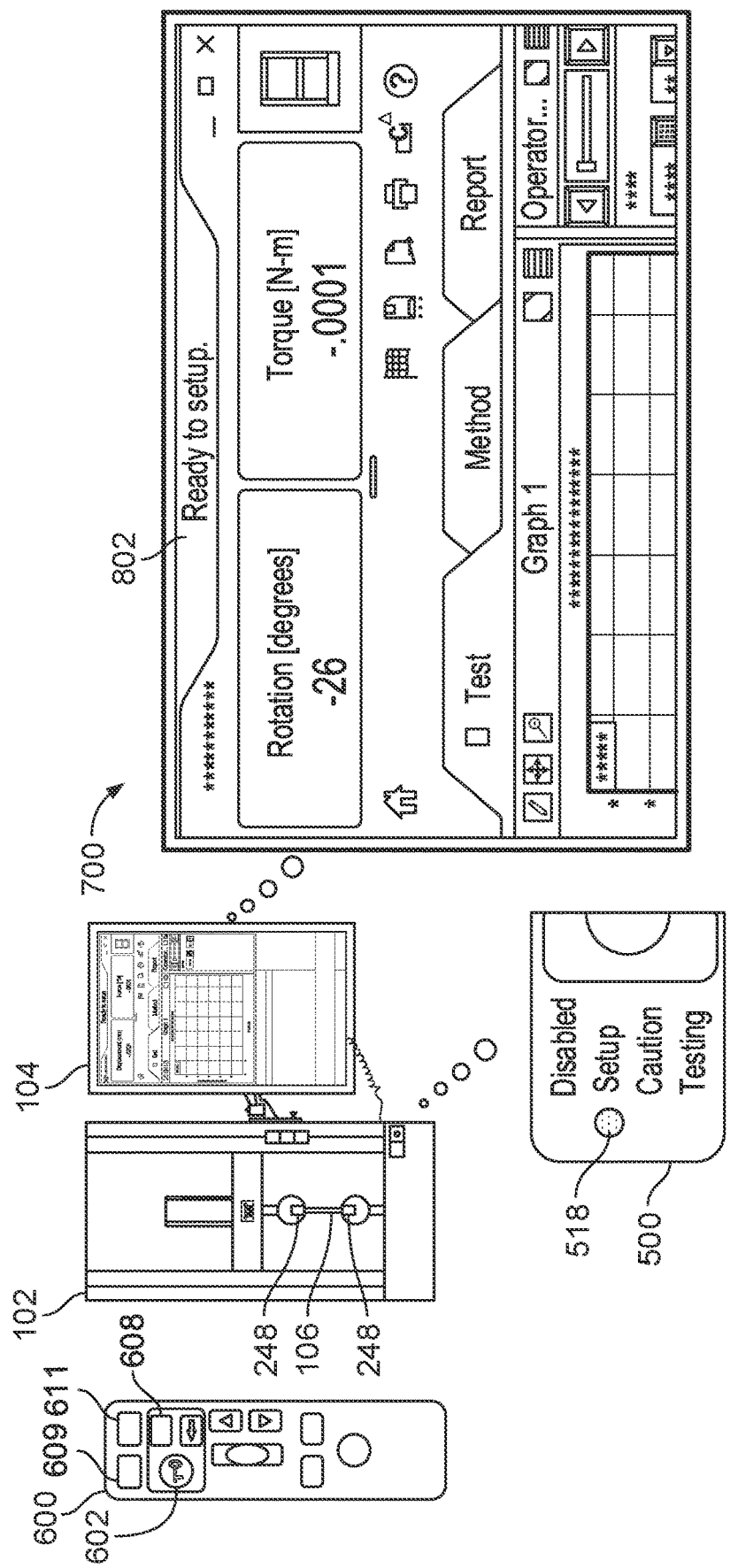
FIGS. 10A, 10B, and 10C illustrates the example material testing system of FIG. 1 and the operator interfaces of FIGS. 5 and 6 while progressing from the setup state to the caution state and the testing state to initiate a material test, in accordance with aspects of this disclosure.
Figure 10B:
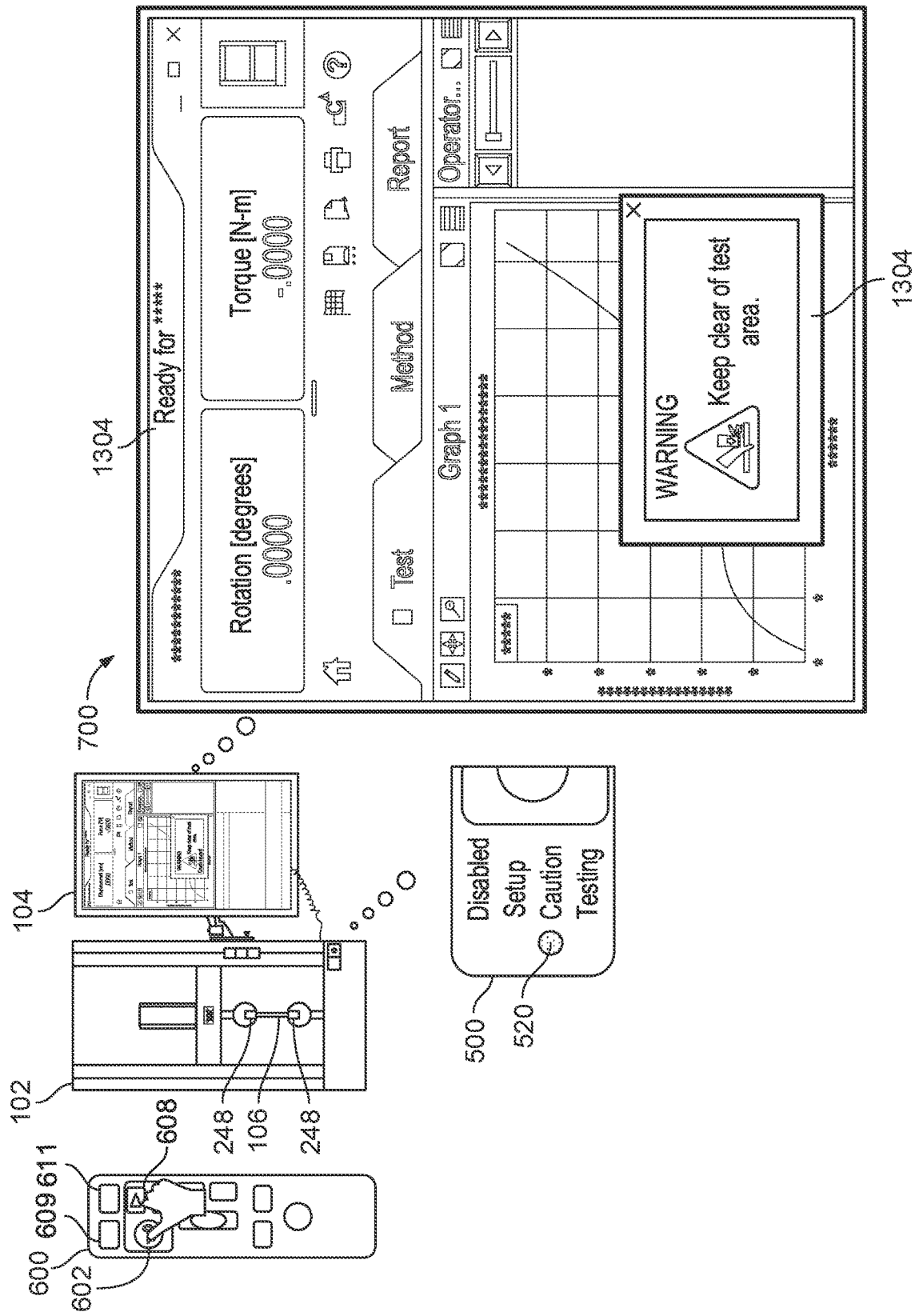
Figure 10C:
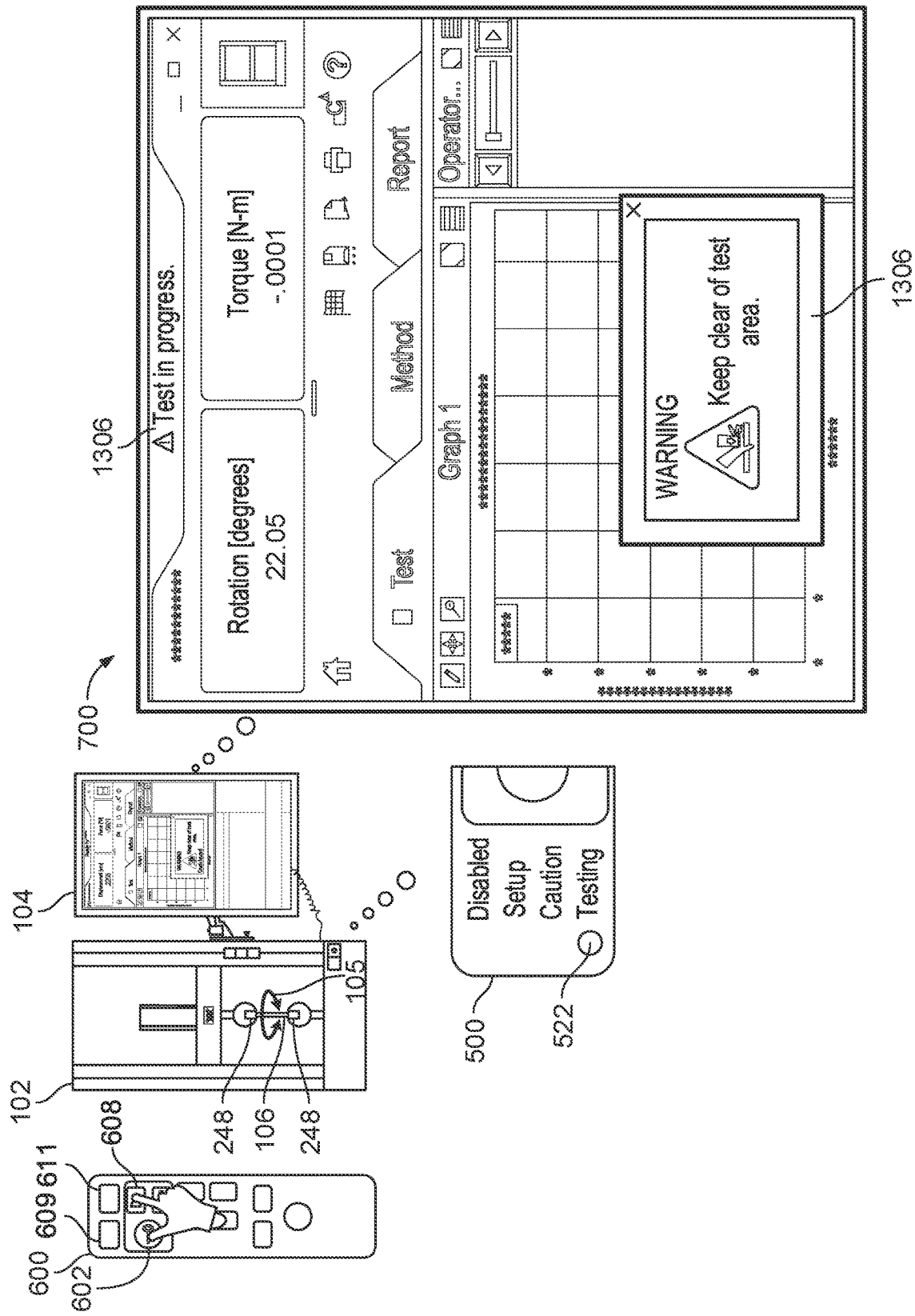

FIGS. 10A, 10B, and 10C illustrates the example material testing system 100 of FIG. 1 and the operator interfaces 500, 600 while progressing from the disabled and/or setup state to the testing state to initiate a material test. The example setup state illustrated in FIG. 10A may be similar or identical to the setup state illustrated in FIG. 8, except that a specimen 106 is held in the grips 248.

The operator may start the material test by first pressing the state control button 602 and then the start button 608. The safety processor 302 controls the caution indicator 520 to illuminate in response to the press of the state control button 602 (FIG. 10B), and the user interface 700 displays an indication 1304 of the testing and/or caution state (e.g., a yellow border and/or active warning overlay). In response to subsequent press of the start button 608, the safety processor 302 then transitions to illuminating the testing indicator 522 (FIG. 10C) and the user interface 700 displays an indication 1306 of the testing state (e.g., a red border and/or active warning overlay). The control processor 238 may then proceed to perform the configured test when the safety processor 302 sets the state to the testing state (e.g., an unrestricted drive mode). The overlay in the user interface 700 may be removed after a period of time, to enable the user to observe the ongoing test measurements on the user interface 700. However, the safety processor 302 may continue to provide other visual, audible, and/or otherwise perceptible warnings during the testing (e.g., displaying or flashing the testing indicator 522, displaying or flashing a red border as the indication 1306 on the user interface 700.

In some examples, the control processor 238 may be configured with a test method that pauses the test for operator interaction with the specimen 106, such as removal of an extensometer. When the test reaches the point where the interaction is required, the control processor 238 pauses the test (e.g., ceases actuation by the motor 242). When the pause point is reached, the safety processor 302 sets the material testing system 100 to the setup state and the user interface 700 displays an indication that the test is paused. Additionally or alternatively, the safety processor 302 may control the setup indicator 518 to visually indicate (e.g., light up, flash) to indicate the test is not complete but in the paused state.

The operator may then resume the test by simultaneously pressing the state control button 602 (e.g., unlock) and the start button 608. The safety processor 302 and the control processor 238 may then resume the test using the same sequence of indicators as to start the test as described above. In some examples, when the state control button 602 is pressed, the user interface 700 displays an indication that the system is in the caution state and that a test is paused.

When the test has been completed, the safety processor 302 automatically sets the state to the setup state and applies the associated restrictions.

Figure 11A:
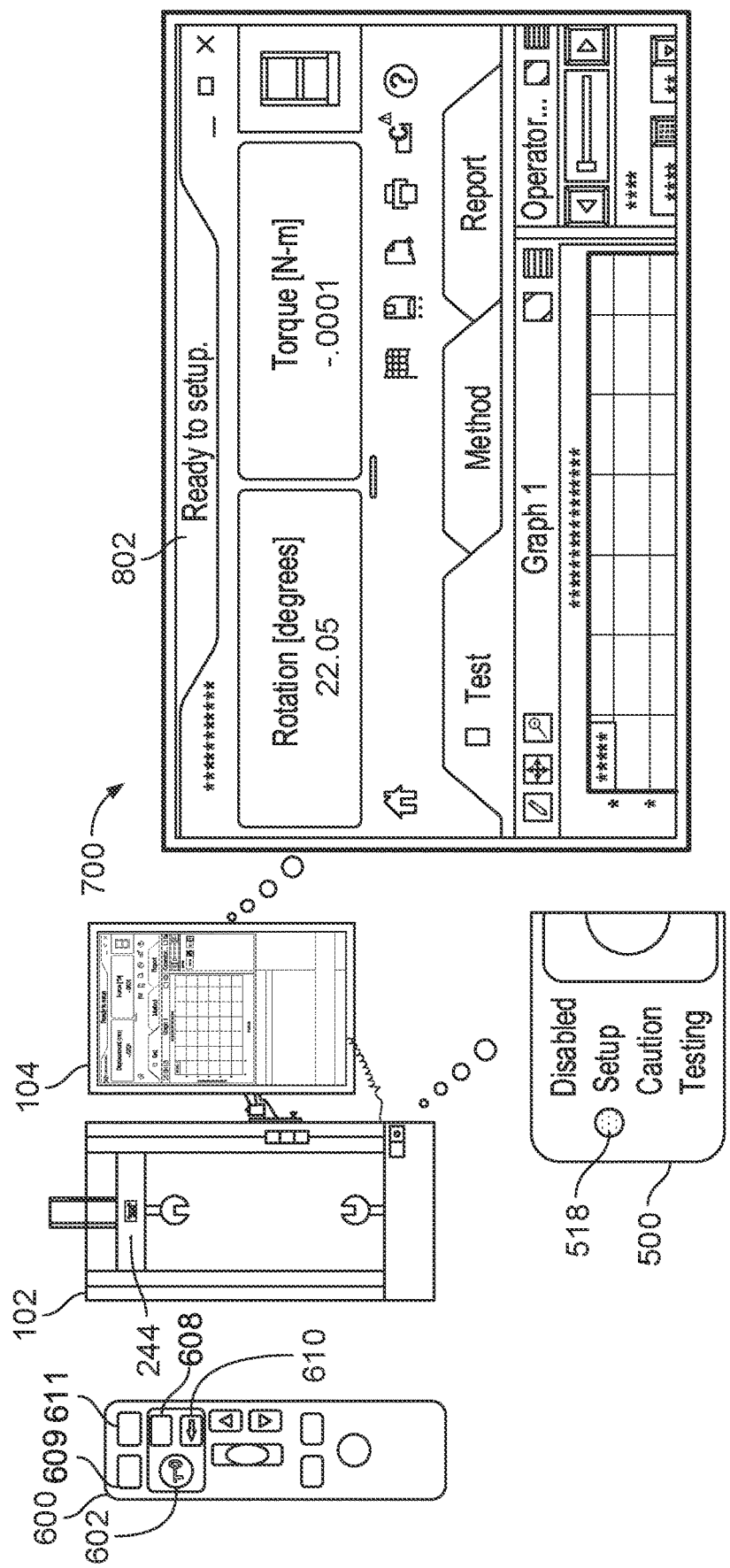
FIGS. 11A, 11B, and 11C illustrates the example material testing system of FIG. 1 and the operator interfaces of FIGS. 5 and 6 while progressing from the setup state to the caution state and the testing state to return the rotational actuator to a desired state or position, in accordance with aspects of this disclosure.
Figure 11B:
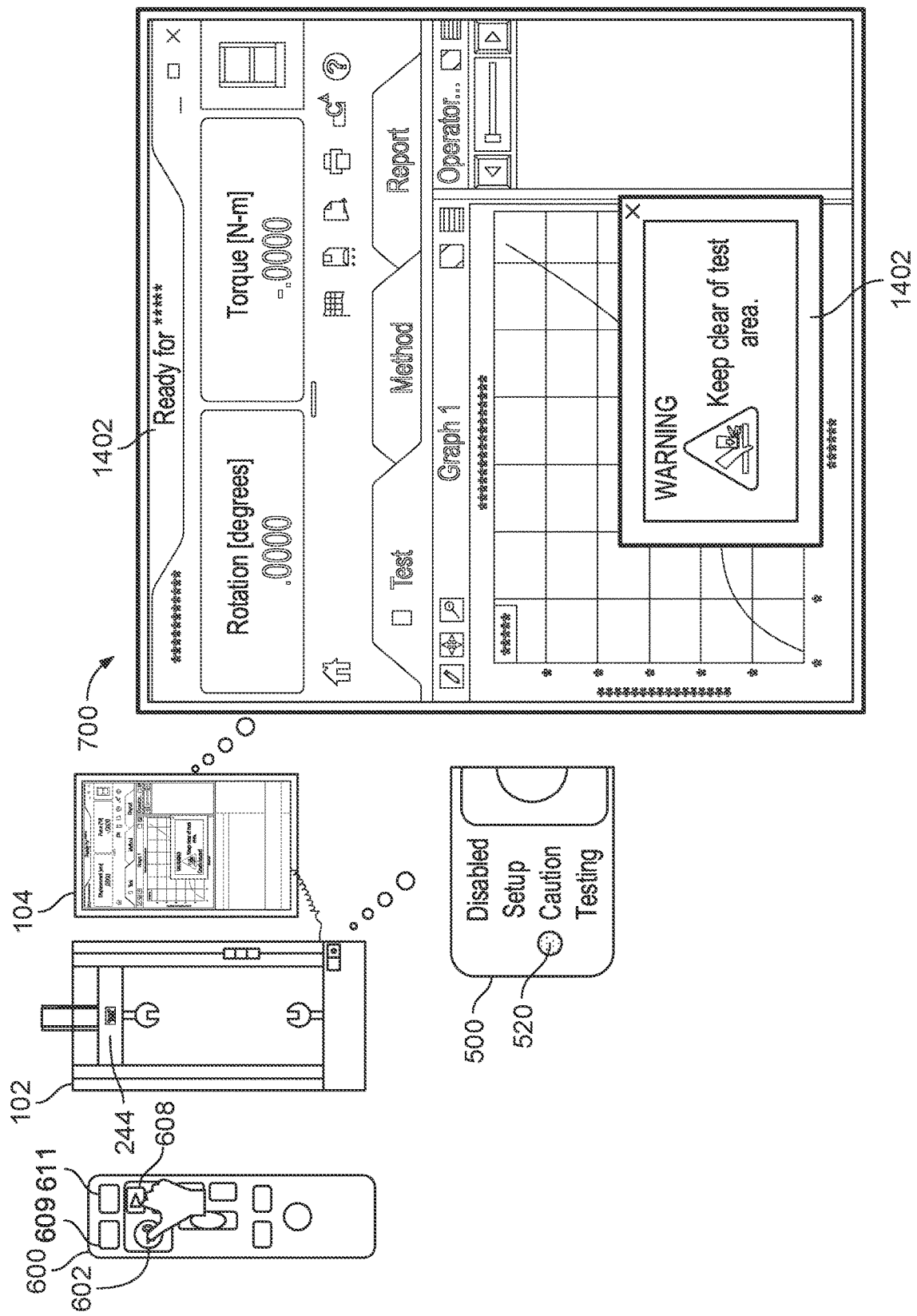
Figure 11C:
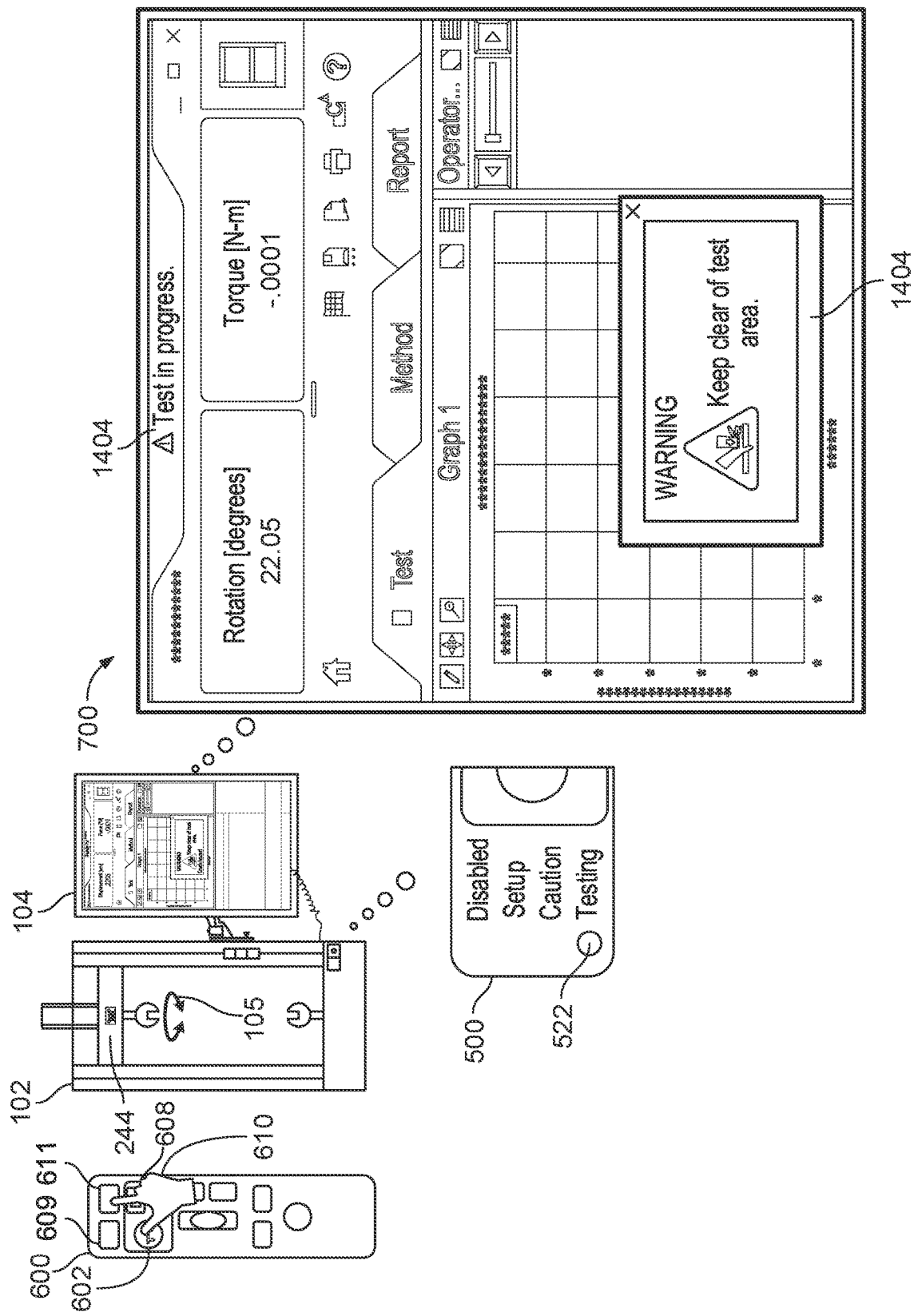

FIGS. 11A, 11B, and 11C illustrates the example material testing system of FIG. 1 and the operator interfaces 500, 600 of FIGS. 5 and 6 while progressing from the setup state to the testing state to return the crosshead 244 to a desired position (e.g., radial and/or axial position). After a previous test ended, the material testing system 100 is set to the setup or disabled state, which is indicated by the illumination of the setup indicator 518. The crosshead 244 may be positioned, for example, at the location at which the prior test finished. In the setup state, the operator is permitted to remove specimens and/or interact with the test fixture 102 and/or the operator interfaces 500, 600, with the restrictions applied by the safety processor 302.

When the operator is ready to return the crosshead 244 to the desired position (e.g., to run another test), the operator may initiate the return by pressing the state control button 602 and the return button 611 (for rotational movement) and/or the return button 610 (for axial movement) simultaneously or sequentially. The safety processor 302 controls the caution indicator 520 to illuminate in response to the press of the state control button 602 (FIG. 11B), and the user interface 700 displays an indication 1402 of the caution state (e.g., a yellow border and/or active warning overlay). In response to subsequent press of the return buttons 611 and/or 610, the safety processor 302 then transitions to illuminating the testing indicator 522 (FIG. 11C) and the user interface 700 displays an indication 1404 of the testing state (e.g., a red border and/or active warning overlay). The control processor 238 may then proceed to control the motor 241 to move the crosshead 244 with reduced or eliminated speed restrictions when the safety processor 302 sets the state to the testing state (e.g., an unrestricted drive mode).

After the crosshead 244 has reached the desired position (e.g., a test starting position), the safety processor 302 automatically sets the state to the setup state.

Although the material testing system 100 consistently (e.g., constantly) has the safety functions enabled and operating, some of the parameters used by the safety system 240 may be adjustable to provide desired interactions (e.g., slower jog speeds than a default jog speed). The example computing device 104 may enable an administrator or other authorized operators to control some parameters of the safety system 240.

While the computing system 104 may provide an interface for configuration of the safety system parameters, the example computing system 104 does not participate in the enforcement of the parameters. To modify parameters of the safety system 240 from the default parameters, the authorized operator or administrator may be required to enable a software security system that authenticates the authorized operator attempting to make changes.

When the security system is enabled, the operator may modify parameters such as the jog rate, grip pressure, point of control (e.g., local or remote), interlock behavior (moveable guard), and/or whether to dismiss notifications when performing actions such as starting a material test. Before and/or after modification, the security system requires the input of valid authentication information to permit the modification of the settings to be committed to the safety system 240 for enforcement. The safety system 240 may be shut down to store configuration changes, resulting in the changing of the state of the material testing system 100 to the disabled state.

The security system for modification is a keyless system, which allows an administrator or other authorized operator to configure the safety system in a manner that is consistent with a particular risk assessment, and prevents a standard operator from overriding these settings. The keyless administrative function prevents accidental and/or purposeful misuses that can occur with conventional safety systems that use a key or selection control.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A material testing system, comprising:
    a rotatable actuator configured to control an operator-accessible torsional testing component of the material testing system;
    a virtual interlock configured to engage or disengage with the actuator to prevent or allow rotational movement of the actuator;
    a brake configured to lock the rotational movement of the rotatable actuator; and
    control circuitry configured to:
        control the actuator to perform a material testing process;
        monitor a plurality of inputs associated with operation of the material testing system;
        identify an operational state of the material testing system from a plurality of predetermined operational states based on the plurality of inputs and the material testing process, the plurality of predetermined operational states comprising one or more of a disabled state, a setup state, a caution state, or a testing state;
        control the virtual interlock based on the identified state;
        identify activation of a non-rotational testing process; and
        engage the brake to lock the actuator from rotational movement in response.

2. The material testing system as defined in claim 1, wherein the virtual interlock is configured to prevent one or more of power or control signals from activating rotational movement of the actuator.

3. The material testing system as defined in claim 1, wherein the control circuitry is further configured to control the virtual interlock to engage or disengage in response to a signal from one or more sensors.

4. The material testing system as defined in claim 1, wherein engagement of the virtual interlock corresponds to a restricted mode, such that the disabled state, the caution state, and the setup state correspond to the restricted mode preventing operation of the actuator.

5. The material testing system as defined in claim 4, wherein the restriction mode corresponds to application of restrictions on the actuator while the control circuitry does not control the actuator in response to operator inputs.

6. The material testing system as defined in claim 5, wherein the restrictions include one or more of limiting a rotational speed of the actuator, limiting a number of revolutions of the actuator, or limiting an angle of rotation of the actuator.

7. The material testing system as defined in claim 6, wherein the limiting is limited to a particular threshold or limited to zero movement.

8. The material testing system as defined in claim 4, wherein the testing state corresponds to an unrestricted mode allowing operation of the actuator, the testing state corresponds to a reduction in restrictions on the actuator operation while controlling the actuator to perform a torsional material testing process or a jog or a return.

9. The material testing system as defined in claim 1, wherein the virtual interlock is engaged and the brake is disengaged and the actuator is configured to allow the operator to manually position the actuator in the setup state.

10. The material testing system as defined in claim 1, wherein the control circuitry comprises:
    a control processor configured to perform the control of the actuator; and
    one or more safety processors configured to perform the monitoring of the plurality of inputs, the identifying the state of the material testing system, and the controlling of the virtual interlock.

11. The material testing system as defined in claim 1, wherein the non-rotational testing process comprises an axial testing process.

12. The material testing system as defined in claim 1, wherein the non-rotational testing operates under a plurality of predetermined operational states comprising one or more of a disabled state, a setup state, a caution state, or a testing state.

13. The material testing system as defined in claim 12, wherein the operational state of the non-rotational testing process holds priority over the operational state of the torsional system.

14. The material testing system as defined in claim 12, wherein when the non-rotational testing process is operating in the setup state, the control circuitry is configured to control the virtual interlock to engage to prevent powered rotational movement of the torsional system.

15. A material testing system, comprising:
    a rotatable actuator configured to control an operator-accessible torsional testing component of the material testing system;
    a brake configured to prevent rotational movement of the rotatable actuator;
    a virtual interlock configured to engage or disengage with the actuator to prevent or allow rotational movement of the actuator; and
    control circuitry configured to:
        control the actuator to perform a material testing process;
        monitor a plurality of inputs associated with operation of the material testing system;
        identify an operational state of the material testing system from a plurality of predetermined operational states based on the plurality of inputs and the material testing process, the plurality of predetermined operational states comprising one or more of a disabled state, a setup state, a caution state, or a testing state;
        control the virtual interlock based on the identified state;
        identify activation of a non-rotational testing process; and
        engage the brake to lock the actuator from rotational movement in response.

16. The material testing system as defined in claim 15, wherein the brake is configured to physically lock the actuator from free rotational movement.

17. The material testing system as defined in claim 15, wherein the brake is configured for manual engagement or disengagement.

18. The material testing system as defined in claim 15, wherein the control circuitry is further configured to identify activation of a non-rotational testing process and engage the brake or the virtual interlock to lock the actuator from free rotational movement in response.

19. The material testing system as defined in claim 18, wherein the non-rotational testing process comprises an axial testing process.

* * * * *